(12) United States Patent
Yapici et al.

(10) Patent No.: US 12,335,032 B2
(45) Date of Patent: Jun. 17, 2025

(54) MULTI-TRANSMISSION ARTIFICIAL NOISE (AN) CANCELLATION

(71) Applicant: QUALCOMM Incorporated, San Diego, CA (US)

(72) Inventors: Yavuz Yapici, Florham Park, NJ (US); Tao Luo, San Diego, CA (US); Igor Gutman, Hod HaSharon (IL); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 17/932,910

(22) Filed: Sep. 16, 2022

(65) Prior Publication Data

US 2024/0106561 A1 Mar. 28, 2024

(51) Int. Cl.
*H04K 1/02* (2006.01)
*H04B 1/10* (2006.01)
*H04B 7/08* (2006.01)

(52) U.S. Cl.
CPC ............... *H04K 1/02* (2013.01); *H04B 1/10* (2013.01); *H04B 7/08* (2013.01)

(58) Field of Classification Search
CPC ........ H04K 1/02; H04K 2203/16; H04K 1/10; H04K 3/825; H04B 1/10; H04B 7/08; H04B 7/024; H04L 25/03318
See application file for complete search history.

(56) References Cited

U.S. PATENT DOCUMENTS

| | | | |
|---|---|---|---|
| 10,069,592 B1 | 9/2018 | Krunz et al. | |
| 2015/0188662 A1 | 7/2015 | Shapira | |
| 2017/0366220 A1* | 12/2017 | Kwon | H04J 13/10 |
| 2019/0229833 A1 | 7/2019 | Ha et al. | |

FOREIGN PATENT DOCUMENTS

WO 2022031246 A1 2/2022

OTHER PUBLICATIONS

X. Zhang, M. R. McKay, X. Zhou and R. W. Heath, "Artificial-Noise-Aided Secure Multi-Antenna Transmission With Limited Feedback," in IEEE Transactions on Wireless Communications, vol. 14, No. 5, pp. 2742-2754, May 2015, (Year: 2015).*
Hamamreh J.M., et al., "Joint PHY/MAC Layer Security Design Using ARQ With MRC and Null-Space Independent PAPR-Aware Artificial Noise in SISO Systems", IEEE Transactions on Wireless Communications, vol. 17, No. 9, Sep. 1, 2018, XP055873193, US, pp. 6190-6204.
International Search Report and Written Opinion—PCT/US2023/073107—ISA/EPO—Jan. 2, 2024.

* cited by examiner

*Primary Examiner* — David S Huang
(74) *Attorney, Agent, or Firm* — Polsinelli

(57) ABSTRACT

Systems and techniques are provided for performing wireless communications. In some aspects, a user equipment (UE) may receive from a first wireless node via a first channel, a first transmission comprising a first artificial noise (AN) signal combined with a first data signal, wherein the first AN signal is generated based on channel state information (CSI) of the first channel. The UE may receive, from a second wireless node via a second channel, a second transmission comprising a second AN signal combined with a second data signal, wherein the second AN signal is generated based on CSI of the second channel and is different from the first AN signal. The UE can determine a data message based on the first transmission and the second transmission.

30 Claims, 13 Drawing Sheets

Standard (TS 38.213) table of slot format

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| ... | ... | ... | ... | ... | ... | ... | ... | ... | ... | ... | ... | ... | ... | ... |
| 20 | D | D | D | F | F | F | F | F | F | F | F | F | F | U |
| 21 | D | D | F | F | F | F | F | F | F | F | F | F | U | U |
| 22 | D | F | F | F | F | F | F | F | F | F | F | U | U | U |
| ... | ... | ... | ... | ... | ... | ... | ... | ... | ... | ... | ... | ... | ... | ... |
| 54 | F | F | F | F | F | F | F | D | F | F | F | F | F | D |
| 55 | D | D | F | F | F | U | U | U | D | D | D | D | D | D |
| 56 – 254 | Reserved | | | | | | | | | | | | | |
| 255 | UE determines the slot format for the slot based on semi-static TDD UL/DL configuration and, if any, on detected DCI formats | | | | | | | | | | | | | |

FIG. 5

MULTI-TRANSMISSION ARTIFICIAL NOISE (AN) CANCELLATION

FIELD

Aspects of the present disclosure generally relate to wireless communication. In some implementations, examples are described for artificial noise (AN) cancellation in wireless communications.

BACKGROUND

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between UEs, which may involve direct transmissions between two or more UEs.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communications. According to at least one illustrative example, a method of wireless communications performed at a user equipment (UE) is provided. The method includes: receiving, from a first wireless node via a first channel, a first transmission comprising a first artificial noise (AN) signal combined with a first data signal, wherein the first AN signal is generated based on channel state information (CSI) of the first channel; receiving, from a second wireless node via a second channel, a second transmission comprising a second AN signal combined with a second data signal, wherein the second AN signal is generated based on CSI of the second channel and is different from the first AN signal; and determining a data message based on the first transmission and the second transmission.

In another example, an apparatus of a user equipment (UE) for wireless communications is provided that includes at least one memory (e.g., configured to store data) and at least one processor (e.g., implemented in circuitry) coupled to the at least one memory. The at least one processor is configured to and can: receive, from a first wireless node via a first channel, a first transmission comprising a first artificial noise (AN) signal combined with a first data signal, wherein the first AN signal is generated based on channel state information (CSI) of the first channel; receive, from a second wireless node via a second channel, a second transmission comprising a second AN signal combined with a second data signal, wherein the second AN signal is generated based on CSI of the second channel and is different from the first AN signal; and determine a data message based on the first transmission and the second transmission.

In another example, a non-transitory computer-readable medium is provided that has stored thereon instructions that, when executed by one or more processors, cause the one or more processors to: receive, from a first wireless node via a first channel, a first transmission comprising a first artificial noise (AN) signal combined with a first data signal, wherein the first AN signal is generated based on channel state information (CSI) of the first channel; receive, from a second wireless node via a second channel, a second transmission comprising a second AN signal combined with a second data signal, wherein the second AN signal is generated based on CSI of the second channel and is different from the first AN signal; and determine a data message based on the first transmission and the second transmission.

In another example, an apparatus for wireless communications performed at a user equipment (UE) is provided. The apparatus includes: means for receiving, from a first wireless node via a first channel, a first transmission comprising a first artificial noise (AN) signal combined with a first data signal, wherein the first AN signal is generated based on channel state information (CSI) of the first channel; means for receiving, from a second wireless node via a second channel, a second transmission comprising a second AN signal combined with a second data signal, wherein the second AN signal is generated based on CSI of the second channel and is different from the first AN signal; and means for determining a data message based on the first transmission and the second transmission.

In another example, a method of wireless communications performed at a first wireless node is provided. The method includes: receiving channel state information (CSI) of a first channel between the first wireless node and an antenna of a user equipment (UE); receiving a first filter coefficient associated with the antenna of the UE; receiving an index value indicative of an assigned position of the first wireless node in a set of wireless nodes; and transmitting, to the UE, a first transmission comprising a first artificial noise (AN) signal combined with a first data signal, wherein the first AN signal is generated based on the CSI of the first channel, the first filter coefficient, and the index value.

In another example, an apparatus of a wireless node for wireless communications is provided that includes at least one memory (e.g., configured to store data) and at least one processor (e.g., implemented in circuitry) coupled to the at least one memory. The at least one processor is configured to and can: receive channel state information (CSI) of a first channel between the wireless node and an antenna of a user equipment (UE); receive a first filter coefficient associated with the antenna of the UE; receive an index value indicative of an assigned position of the wireless node in a set of wireless nodes; and transmit, to the UE, a first transmission comprising a first artificial noise (AN) signal combined with a first data signal, wherein the first AN signal is generated based on the CSI of the first channel, the first filter coefficient, and the index value.

In another example, a non-transitory computer-readable medium is provided that has stored thereon instructions that, when executed by one or more processors, cause the one or more processors to: receive channel state information (CSI) of a first channel between the wireless node and an antenna of a user equipment (UE); receive a first filter coefficient associated with the antenna of the UE; receive an index value indicative of an assigned position of the wireless node in a set of wireless nodes; and transmit, to the UE, a first transmission comprising a first artificial noise (AN) signal combined with a first data signal, wherein the first AN signal is generated based on the CSI of the first channel, the first filter coefficient, and the index value.

In another example, an apparatus for wireless communications performed at a first wireless node is provided. The apparatus includes: means for receiving channel state information (CSI) of a first channel between the first wireless node and an antenna of a user equipment (UE); receiving a first filter coefficient associated with the antenna of the UE; receiving an index value indicative of an assigned position of the first wireless node in a set of wireless nodes; and transmitting, to the UE, a first transmission comprising a first artificial noise (AN) signal combined with a first data signal, wherein the first AN signal is generated based on the CSI of the first channel, the first filter coefficient, and the index value.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 5 is a diagram illustrating an example of a slot format table, which may be employed by the disclosed systems and techniques, in accordance with some examples;

DETAILED DESCRIPTION

Figure 1:
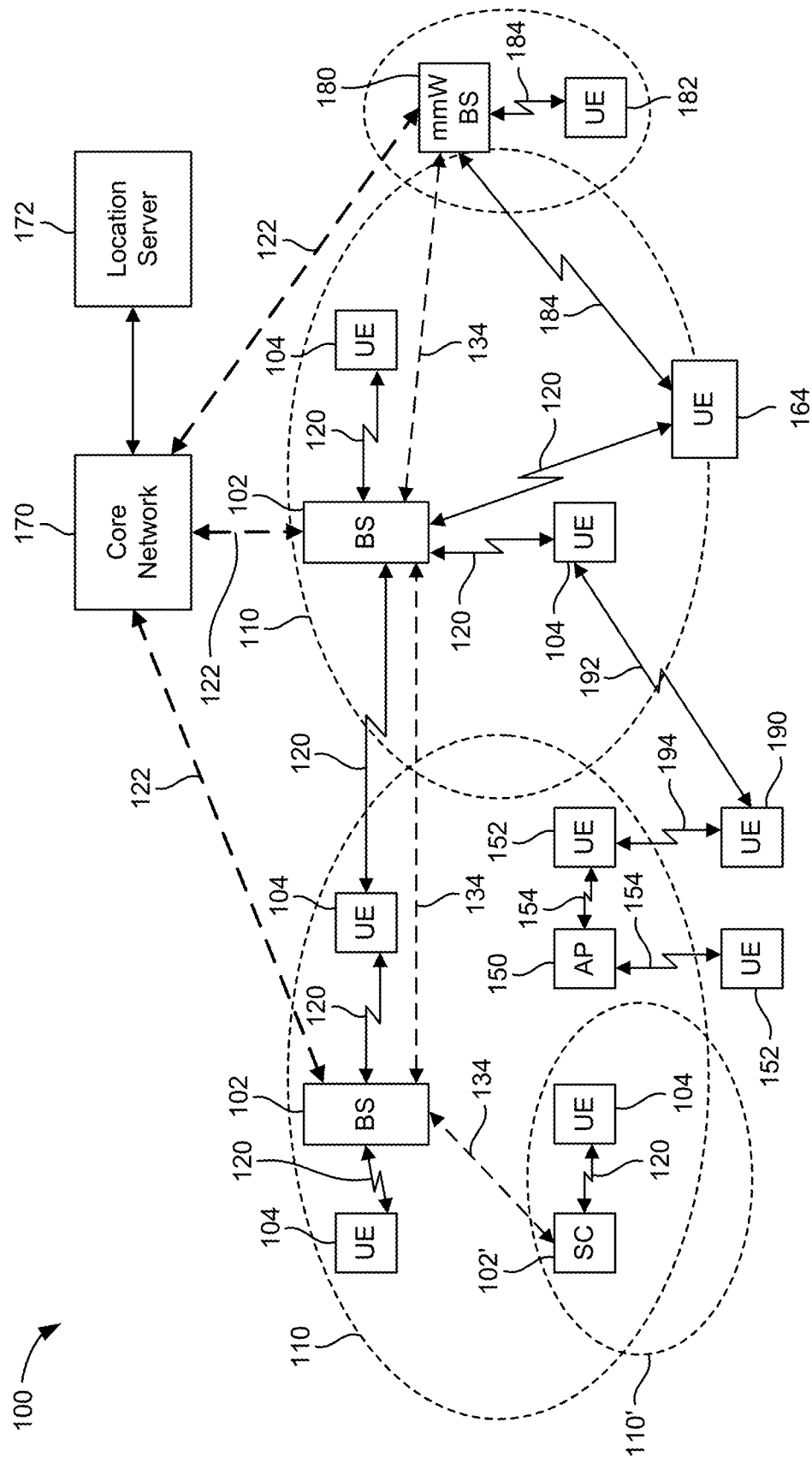
FIG. 1 is a block diagram illustrating an example of a wireless communication network that may be employed by the disclosed systems and techniques, in accordance with some examples.

Certain aspects and examples of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and examples described herein may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides example aspects, and is not intended to limit the scope, applicability, or configuration of the disclosure. Rather, the ensuing description of the exemplary aspects will provide those skilled in the art with an enabling description for implementing examples and aspects of the disclosure. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

Security is an important aspect of wireless communications. Wireless channels are broadcast in nature and in some examples, any wireless device with radio frequency (RF) capability (e.g., a user equipment (UE)) may potentially eavesdrop or intercept ongoing transmissions or data exchanges. In internet of things (IoT) device communications, where a large quantity of devices may be connected to and/or communicate with one another, the risk to security may be even greater due to the relatively high number of potential data leak points. As a result, there is a need to prevent eavesdropping by unauthorized receivers and to prevent information leakage in wireless communications.

Upper layer communications may be communicated using pre-configured security mechanisms, such as cryptographic functions. However, the transmission of reference signals (RSs) and/or other information transmitted over physical control channels (e.g., such as a physical downlink control channel (PDCCH), a physical uplink control channel (PUCCH), etc.) may be unsecured.

For example, physical control channels (e.g., PDCCH, PUCCH, etc.) and RSs may be utilized to perform various network functions (e.g., channel estimation, uplink (UL) and downlink (DL) grant, positioning, etc.), but are transmitted without security protection or security mechanisms to prevent eavesdropping by unauthorized receivers. In some cases, if an eavesdropper (e.g., an unauthorized receiver) were to intercept and modify such control information, the eavesdropper could cause an out-of-service event for the UE (e.g., or other intended receiver) or cause a degradation of data throughput. Such an attack could also impair the reliability of wireless communications. There is a need for systems and techniques that can be used to secure physical (PHY) layer transmissions.

Systems, apparatuses, processes (also referred to as methods), and computer-readable media (collectively referred to as "systems and techniques") are described herein that can be used to secure PHY layer transmissions and signals based on spatial artificial noise (AN) cancellation. For example, a data message (e.g., also referred to as a "legitimate message" or a "confidential message") can be transmitted by multiple transmitters (e.g., base stations or UEs) to a given receiver (e.g., another base station or UE). In some cases, each transmitter can transmit the same data message. For example, each transmitter can transmit the entire data message. In some cases, one or more (or all) of the transmitters can transmit a different portion of the data message, such that the given receiver obtains each portion of the data message from at least one of the transmitters.

In some cases, artificial noise (AN) may be added to PHY layer transmissions to mask a legitimate or confidential data message. For example, AN injection (e.g., the addition of an AN signal to a confidential data signal) can be used to prevent an eavesdropping device from properly decoding the legitimate signal, and in some cases, may prevent the eavesdropping device from recognizing PHY layer transmissions at all. As will be described in greater depth below, an AN signal may be added to a legitimate data signal (e.g., or a portion thereof) by a transmitter without an impact on time-domain or frequency-domain resources. In some examples, AN may be added to any PHY layer communication, including RSs, physical control channels, physical shared channels, physical sidelink channels, etc. It should be noted that the term "channel," as used herein, may relate to the physical layer communication channel(s) and/or region(s) of a communication channel (e.g., RS regions, control regions, data regions, etc.) to which AN may be added.

AN is a signal that is transmitted concurrently with or otherwise added to (e.g., combined with) a legitimate signal to intentionally corrupt the legitimate signal. In some examples, an AN signal may be generated based on channel state information (CSI) and/or channel quality information (CQI)) associated with one or more of a transmitting node (e.g., a UE or a base station) and/or an intended recipient node (e.g., another UE or base station). For example, an AN signal may be generated based on CSI associated with a channel between a base station and a UE.

In some cases, a CSI reference signal (CSI-RS) may be transmitted by a network node (e.g., a base station or an aspect of a disaggregated base station) to a UE. The UE may use the CSI-RS to estimate channel quality and report the estimated channel quality (e.g., via CQI) back to the network node. The CSI-RS and the reported CSI described herein may be implemented across a broad variety of telecommunication systems, network architectures, and communication standards (e.g., 3rd Generation Partnership Project (3GPP)).

In some examples, a plurality of AN signals can be generated for a same legitimate signal (e.g., or portions thereof) and used to transmit a corrupted or obfuscated version of the legitimate signal (or corresponding portion thereof), such that the AN component of each transmission may be canceled out at the desired recipient after soft-combining spatially separate instances of the transmissions. In some examples, a plurality of transmitting devices (e.g., base stations and/or UEs) may be used to collaboratively provide security to a PHY layer signal based on each transmitting device of the plurality of transmitting devices intentionally impairing a legitimate signal by adding AN in the power domain. In some aspects, the legitimate signal and the AN may use the same precoder.

In some examples, the desired receiver (e.g., another base station or UE) can decode the legitimate data message by removing (e.g., canceling out) the AN signal portion or contribution that is included in each of the plurality of transmissions received from the transmitting devices. For example, the systems and techniques can be used to provide collaborative spatial AN cancellation, wherein a UE receives a plurality of AN-impaired transmissions that are each generated based on combining a different AN signal with a respective copy of the legitimate data message (e.g., or a portion thereof).

In some aspects, a plurality of transmitters can generate the plurality of AN-impaired transmissions based on CSI of the channel between a respective transmitter (e.g., base station or UE) and the intended receiver (e.g., UE). Based on using the CSI of the intended receiver to generate the AN signal that is added to each copy of the legitimate data message, the AN signals can be generated such that the AN contribution vanishes automatically (e.g., is cancelled out) when the intended receiver soft combines all received copies of the AN-impaired transmissions. In some aspects, the systems and techniques can be used to implement AN-cancellation using AN signals that are spatially designed based on the intended receiver's CSI such that the contribution of the AN signals can be eliminated only by the intended receiver.

In some cases, soft combining can be performed by combining a plurality of received signals or transmissions using a statistical algorithm (e.g., or other means) for use in error recovery. For example, soft combining can be performed based on using one or more buffers to store received transmissions for a subsequent combining operation. In some examples, multiple AN-impaired transmissions received at a UE or other intended receiver can be combined to automatically eliminate (e.g., cancel) the AN contribution included in each of the AN-impaired transmissions. After eliminating the AN contribution from the multiple AN-impaired transmissions, the legitimate data message (e.g., that was combined with a different AN signal at each transmitter that generated an AN-impaired transmission) remains and can be decoded or otherwise used by the UE. In some aspects, by transmitting multiple AN-impaired transmissions, the signal-to-noise ratio (SNR) of the legitimate data message that is recovered at the UE (e.g., based on the soft combining described above) can be improved relative to transmitting the legitimate data message using a single transmission.

In some examples, an eavesdropping device will be unable to recover the legitimate data message based on receiving some (or all) of the AN-impaired transmissions. For example, the AN-impaired transmissions may be generated using an AN signal that is based on the CSI between each transmitter (e.g., base station or UE) and the intended receiver (e.g., UE). When the eavesdropping device is not in the same location as the intended receiver, the CSI between the eavesdropping device and each transmitter will be different than the CSI between the intended receiver and each respective transmitter. Because the eavesdropping device therefore receives any intercepted AN-impaired transmission with a different CSI, the eavesdropping device will be unable to eliminate the AN contribution(s) included in any intercepted AN-impaired transmissions (e.g., the spatial dimensions of the AN-impaired transmissions may not be eliminated by the eavesdropping device even with soft combining of the multiple signals).

In some aspects, the plurality of transmitting devices may transmit each of the AN-impaired transmissions simultaneously. For example, the AN-impaired transmissions can be transmitted simultaneously based on each AN-impaired transmission using a different beam associated with a unique antenna, antenna port, or antenna group of the intended receiver (e.g., UE). In some cases, the plurality of AN-impaired transmissions can be transmitted such that the intended receiver (e.g., UE) receives some (or all) of the plurality of AN-impaired transmissions within a same time slot and/or frequency band. In some aspects, the plurality of transmitting devices may transmit the AN-impaired transmissions using time or frequency multiplexing. For example, an intended receiver (e.g., UE) can receive a plurality of AN-impaired transmissions (e.g., from different transmitters) that are multiplexed in time (e.g., using time division duplexing (TDD)) or are multiplexed in frequency (e.g., using frequency division duplexing (FDD)).

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
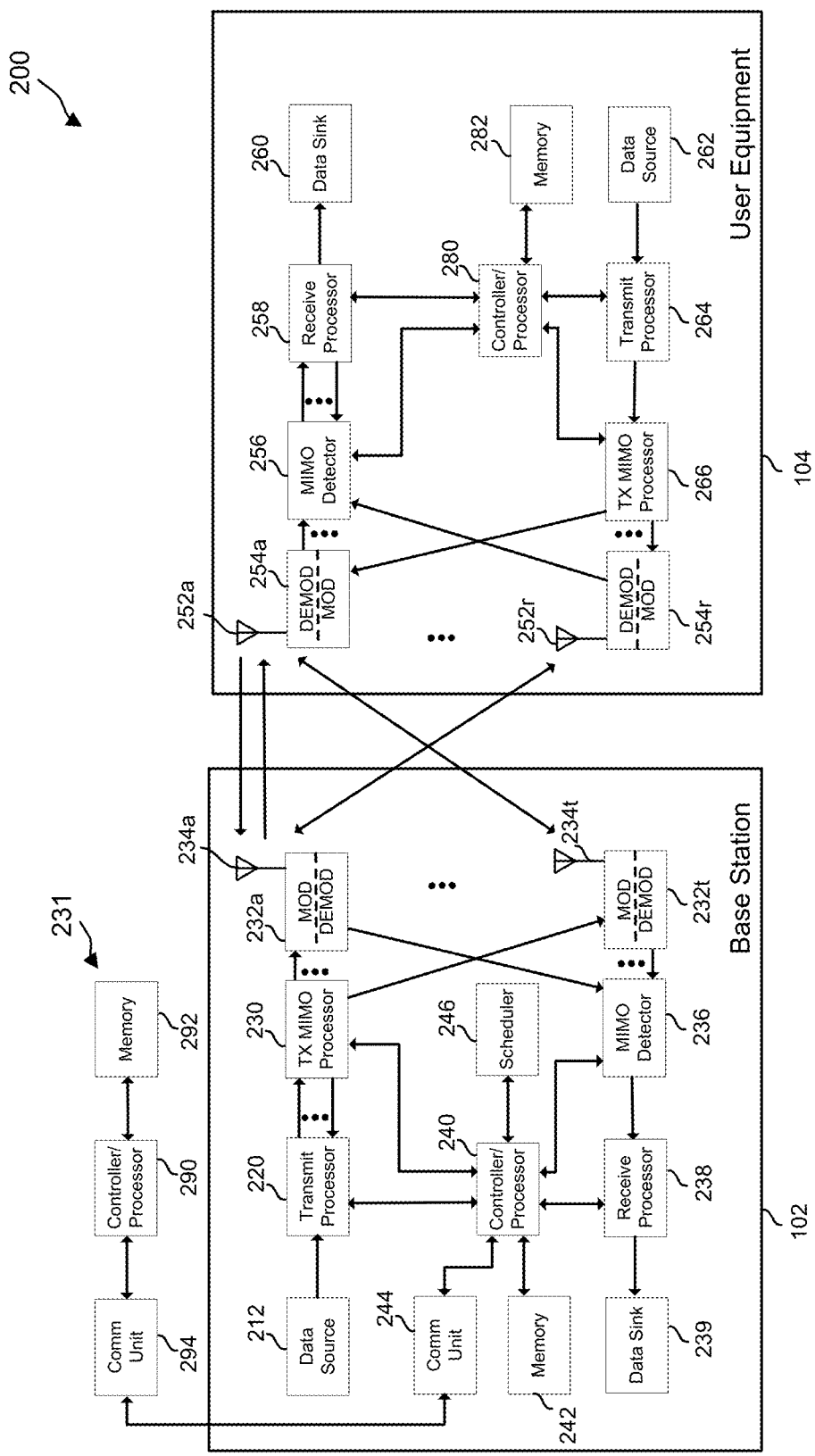
FIG. 2 is a diagram illustrating a design of a base station and a user equipment (UE) device that enable transmission and processing of signals exchanged between the UE and the base station, which may be employed by the disclosed systems and techniques, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream (e.g., for an orthogonal frequency-division multiplexing (OFDM) scheme and/or the like) to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to one or more demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
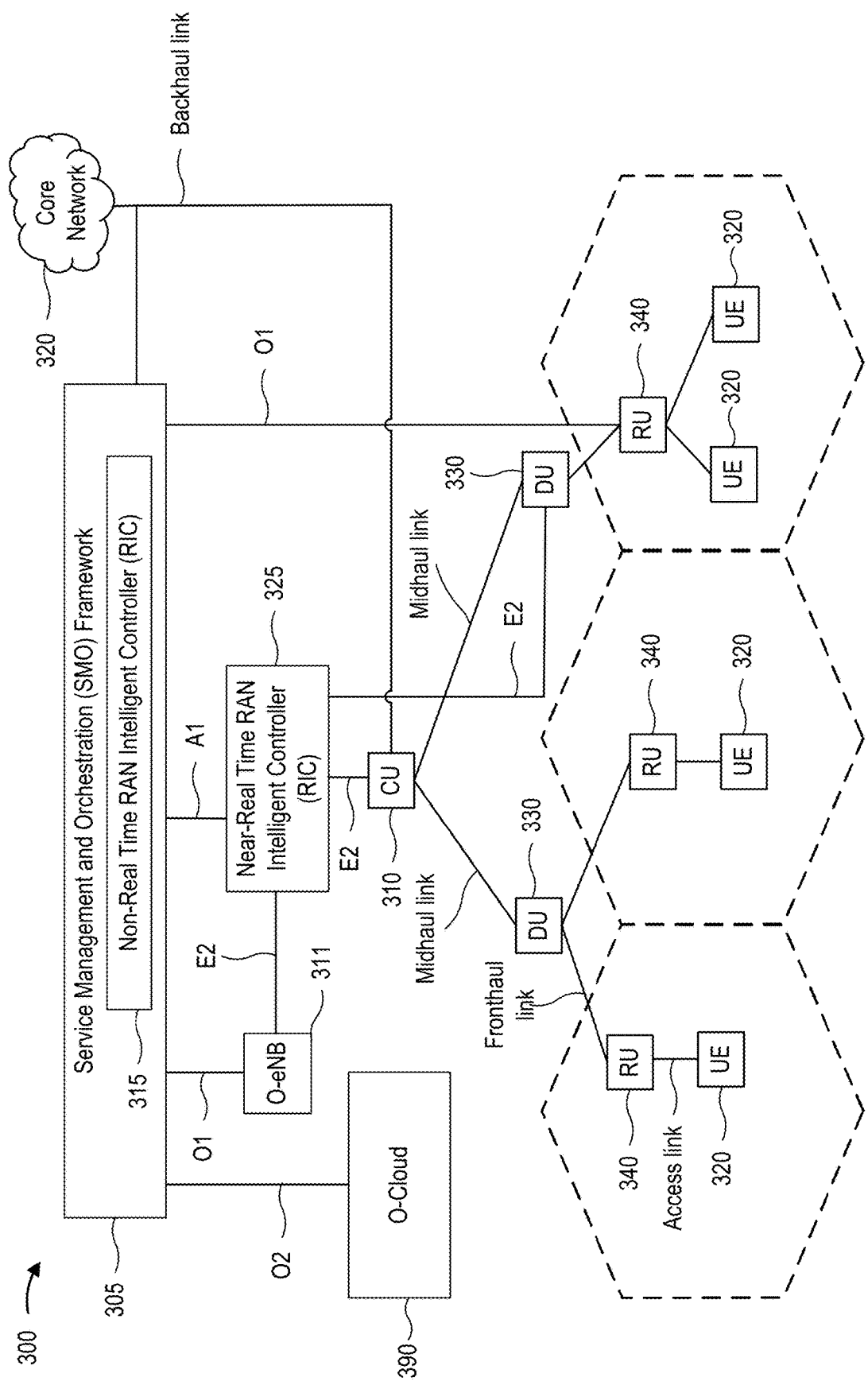
FIG. 3 is a diagram illustrating an example of a disaggregated base station architecture, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUs 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
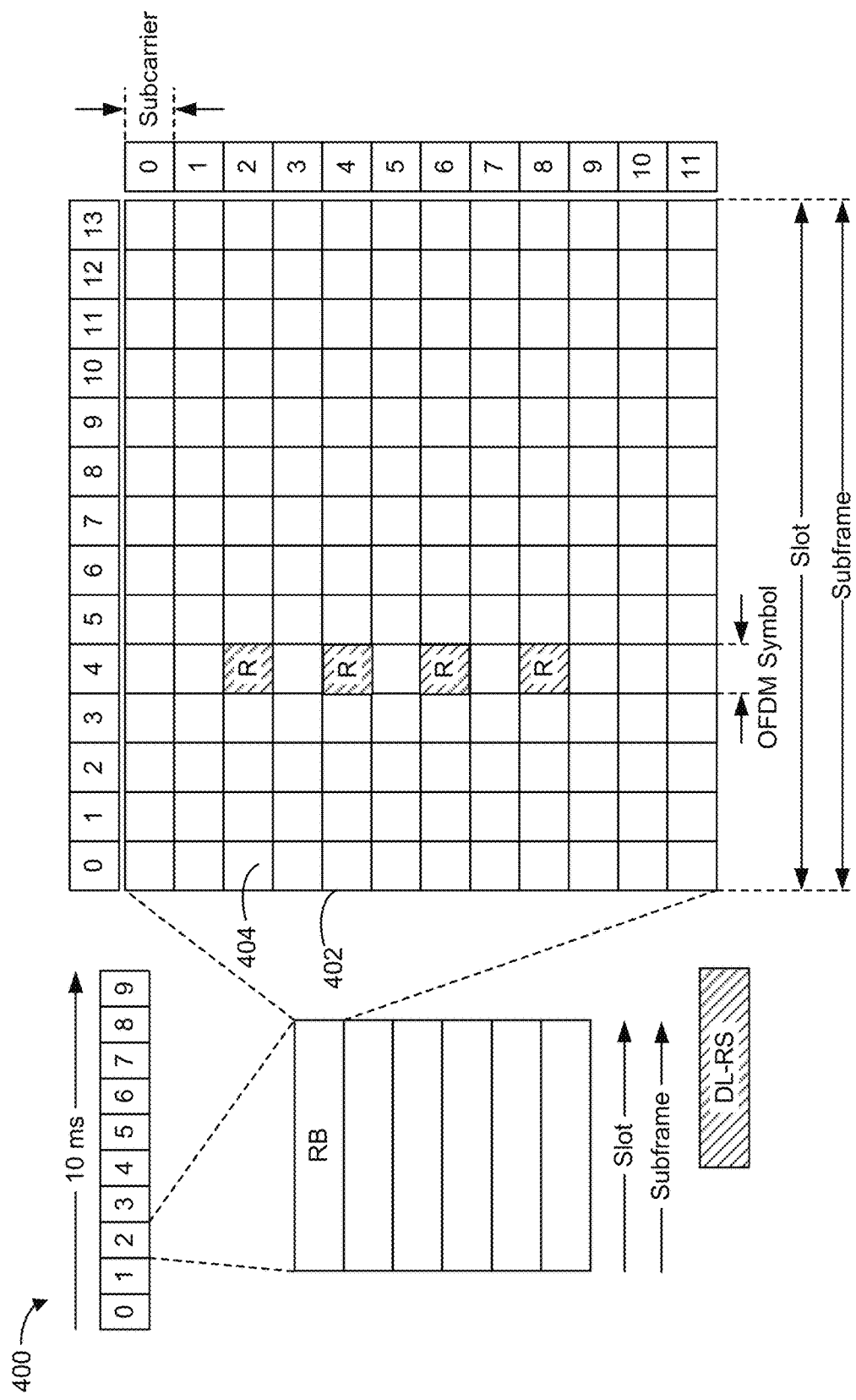
FIG. 4 is a diagram illustrating an example of a frame structure, which may be employed by the disclosed systems and techniques, in accordance with some examples.

Various radio frame structures may be used to support downlink, uplink, and sidelink transmissions between network nodes (e.g., base stations and UEs). FIG. 4 is a diagram 400 illustrating an example of a frame structure, which may be employed by the disclosed systems and techniques for CLI cancellation, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 resource blocks), and there may be 1, 2, 4, 8, or 16 subbands for system bandwidth of 1.25, 2.5, 5, 10, or 20 MHz, respectively.

vLTE supports a single numerology (subcarrier spacing, symbol length, etc.). In contrast, NR may support multiple numerologies (O. For example, subcarrier spacing (SCS) of 15 kHz, 30 kHz, 60 kHz, 120 kHz, and 240 kHz or greater may be available. Table 1 provided below lists some various parameters for different NR numerologies.

RS), Demodulation Reference Signal (DM-RS), Primary Synchronization Signal (PSS), Secondary Synchronization Signal (SSS), etc. The resource grid if FIG. 4 illustrates exemplary locations of REs used to transmit DL-RS (labeled "R").

In some aspects, some of the REs carry DM-RS for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. In some implementations, the PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI. In some cases, the PUCCH can be periodic (P), semi-persistent (SP), aperiodic (AP), and/or any combination thereof.

TABLE 1

| | SCS (kHz) | Symbols/ Sot | Slots/ Subframe | Slots/ Frame | Slot Duration (ms) | Symbol Duration (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 4 illustrates an example of a resource block (RB) 402. The resource grid is further divided into multiple resource elements (REs). Referring to FIG. 4, the RB 402 includes multiple REs, including the resource element (RE) 404. The RE 404 may correspond to one symbol length in the time domain and one subcarrier in the frequency domain. In the numerology of FIG. 4, for a normal cyclic prefix, RB 402 may contain 12 consecutive subcarriers in the frequency domain and seven consecutive symbols in the time domain, for a total of 84 REs such as RE 404. For an extended cyclic prefix, an RB may contain 12 consecutive subcarriers in the frequency domain and six consecutive symbols in the time domain, for a total of 72 REs. The number of bits carried by each RE depends on the modulation scheme.

In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI- In some cases, the UE may transmit sounding reference signals (SRS). In some implementations, the SRS may be transmitted in the last symbol of a subframe. In some cases, the SRS may have a comb structure, and a UE may transmit SRS on one of the combs. The SRS may be used by a base station for channel quality estimation to enable frequency-dependent scheduling on the UL. In some implementations, the SRS can be P, SP, AP, and/or any combination thereof.

In some aspects, one or more resources in the resource grid can be used to perform sidelink communications. For example, sidelink communications can be implemented using a mode (e.g., mode 1) in which a base station (e.g., base station 102 of FIG. 1) can designate/select one or more resources (e.g., resource elements (e.g., RE 404), resource blocks (e.g., RB 402), subcarriers, symbols, frames, sub-frames, etc.) for sidelink communications. In another example, sidelink communications can be implemented using a mode (e.g., mode 2) in which a UE (e.g., UE 104 of FIG. 1) can designate/select one or more resources (e.g., resource elements (e.g., RE 404), resource blocks (e.g., RB 402), subcarriers, symbols, frames, sub-frames, etc.) for sidelink communications. In some aspects, resource allocation for sidelink communications can correspond to one or more subchannels in the frequency domain and one or more slots in the time domain. In some cases, a subchannel may include from 10 RBs to 100 RBs. In some examples, a sidelink slot may include 7-14 OFDM symbols.

In some examples, a UE (e.g., UE 104 of FIG. 1) can be configured to receive a sidelink packet by performing blind decoding of all sidelink subchannels. In some aspects, the sidelink UE can decode a Physical Sidelink Control Channel (PSCCH) in a configured sidelink resource pool. In some cases, the PSCCH can be used to carry sidelink control information (SCI) which contains information about the resource allocation on the Physical Sidelink Shared Channel (PSSCH). For example, a first stage SCI can be transmitted in PSCCH and may include information regarding the PSSCH bandwidth as well as resource reservations in future slots. In some cases, a second stage SCI can be located and decoded after decoding PSCCH. In some aspects, a source identifier and/or a destination identifier can be used to determine a source and/or destination UE associated with a packet. In some examples, the UE can proceed with decoding PSSCH if PSCCH (e.g., SCI) indicates a receiver ID matching the UE's ID. In some configurations, PSCCH and PSSCH can be transmitted using the same slot.

In some examples, PSCCH may be configured to occupy or use multiple RBs in a single subchannel. In some aspects, a subchannel can occupy multiple PRBs (e.g., a subchannel can occupy 10, 15, 20, 25, 50, 75, 100 PRBs). In some cases, PSCCH may be configured to occupy 10, 12, 15, 20, or 25 PRBs in a subchannel. In some aspects, PSCCH may be limited to one subchannel. In some cases, the duration of PSCCH can be configured use 2 or 3 symbols. In some aspects, a resource pool (RP) can include any number of subchannels (e.g., a RP can include 1-27 subchannels). In some cases, the size of PSCCH may be fixed for a RP (e.g., size can correspond to 10% to 100% of a subchannel). In some examples, PSSCH may occupy 1 or more subchannels and may include a second stage SCI.

FIG. 5 is a diagram illustrating an example of a slot format table 500. In one or more examples, the slot format (e.g., as designated in a slot format table 500) may provide a network entity (e.g., a UE) with the required downlink and/or uplink transmission pattern. In some examples of the disclosed system, the slot format may provide the network entity an indication of an allocation of some of its resources (e.g., allocating RF sensing resources for communications purposes).

In one or more examples, a slot can be utilized as a dynamic scheduling unit (e.g., for communications and/or for RF sensing). The number of OFDM symbols per slot is typically fixed (e.g., as in NR). For example, when the cyclic prefixes (CPs) of an OFDM waveform have a normal duration, there are typically a total of fourteen OFDM symbols. In another example, when the CPs of an OFDM waveform have an extended duration, there are typically a total of twelve slots. The example slot format table 500 in FIG. 5 shows a total of fourteen OFDM symbols per slot.

In some cases, a slot may be classified as downlink, where all of the symbols of the slot are dedicated for the downlink transmissions. In some cases, a slot may be classified as uplink, where all of the symbols of the slot are dedicated for uplink transmissions. In the case of half duplex frequency division duplexing (FDD), all symbols within a slot for a downlink carrier are used for downlink transmissions, and all symbols within a slot for an uplink carrier are used for uplink transmissions.

However, in the case of time division duplexing (TDD) (e.g., as is shown in the slot format table 500 of FIG. 5), it is possible for a slot to be configured to be used for a mix of uplink and downlink transmissions. When using a mix of uplink and downlink transmissions for a slot, a guard period may be necessary for the transceiver switching from the downlink to the uplink, and to allow for a timing advance in the uplink.

NR TDD utilizes a flexible slot configuration (e.g., which is shown in the slot format table 500 of FIG. 5). For this configuration, OFDM symbols of a slot can be designated as "downlink" (e.g., represented by a "D" letter) for downlink transmissions, "uplink" (e.g., representing by a "U" letter) for uplink transmissions, or "flexible" (e.g., represented by an "F" letter). The flexible symbol "F" can be configured for either uplink or downlink transmissions. One of the intentions of introducing the flexible symbols within the slots is to handle the required guard period. It should be noted that if a slot format is not provided by the network (e.g., a network entity), all of the OFDM symbols are considered to be "flexible" as a default.

NR supports the slot format configuration in static, semi-static, or dynamic fashion. The static slot configuration and the semi-static slot configuration are executed using RRC, while the dynamic slot configuration is executed using physical downlink control channel (PDCCH) DCI. In TDD, for small and/or isolated cells, dynamic TDD may be more suitable to adapt to variations in traffic. For large cells, the semi-static TDD may be more suitable for handling interference issues.

Figure 6:
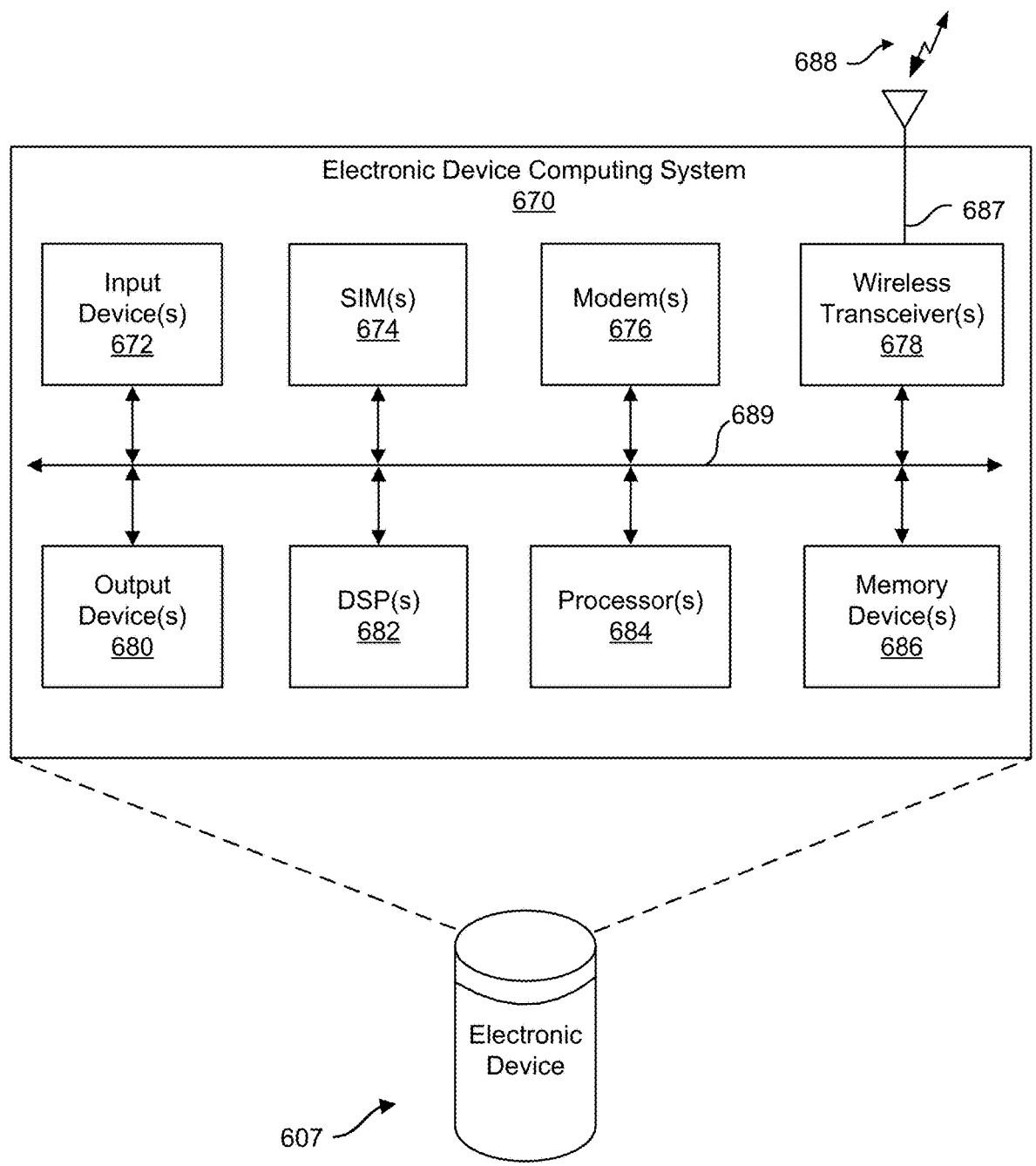
FIG. 6 is a block diagram illustrating an example of a computing system of an electronic device that may be employed by the disclosed systems and techniques, in accordance with some examples.

FIG. 6 is a block diagram illustrating an example of a computing system 670 of an electronic device 607 that may be employed by the disclosed systems and techniques, in accordance with some examples. The electronic device 607 is an example of a device that can include hardware and software for the purpose of connecting and exchanging data with other devices and systems using a communications network (e.g., a 3GPP network, such as a 5G/NR network, a 4G/LTE network, a WiFi network, or other communications network). For example, the electronic device 607 can include, or be a part of, a mobile device (e.g., a mobile telephone), a wearable device (e.g., a network-connected or smart watch), an extended reality device (e.g., a VR device, an AR device, or a MR device), a personal computer, a laptop computer, a tablet computer, an IoT device, a wireless access point, a router, a vehicle or component of a vehicle, a server computer, a robotics device, and/or other device used by a user to communicate over a wireless communications network. In some cases, the device 607 can be referred to as UE, such as when referring to a device configured to communicate using 5G/NR, 4G/LTE, or other telecommunication standard. In some cases, the device can be referred to as a station (STA), such as when referring to a device configured to communicate using the Wi-Fi standard.

The computing system 670 includes software and hardware components that can be electrically or communicatively coupled via a bus 689 (or may otherwise be in communication, as appropriate). For example, the computing system 670 includes one or more processors 684. The one or more processors 684 can include one or more CPUs, ASICs, FPGAs, APs, GPUs, VPUs, NSPs, microcontrollers, dedicated hardware, any combination thereof, and/or other processing device/s and/or system/s. The bus 689 can be used by the one or more processors 684 to communicate between cores and/or with the one or more memory devices 686.

The computing system 670 may also include one or more memory devices 686, one or more digital signal processors (DSPs) 682, one or more subscriber identity modules (SIMs) 674, one or more modems 676, one or more wireless transceivers 678, one or more antennas 687, one or more input devices 672 (e.g., a camera, a mouse, a keyboard, a touch sensitive screen, a touch pad, a keypad, a microphone or a microphone array, and/or the like), and one or more output devices 680 (e.g., a display, a speaker, a printer, and/or the like).

The one or more wireless transceivers 678 can receive wireless signals (e.g., signal 688) via antenna 687 from one or more other devices, such as other user devices, network devices (e.g., base stations such as evolved Node Bs (eNBs) and/or gNodeBs (gNBs), WiFi access points (APs) such as routers, range extenders or the like, etc.), cloud networks, and/or the like. In some examples, the computing system 670 can include multiple antennas or an antenna array that can facilitate simultaneous transmit and receive functionality. Antenna 687 can be an omnidirectional antenna such that RF signals can be received from and transmitted in all directions. The wireless signal 688 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 678 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 688 into a baseband or intermediate frequency and can convert the RF signals to the digital domain.

In some aspects, the one or more wireless transceivers 678 can perform alternating transmit and receive functions (e.g., performing a half-duplex operation). For example, the one or more wireless transceivers 678 can alternately enable an RF transmitter to transmit an uplink Tx signal when the one or more wireless transceivers 678 are not enabled to receive (e.g., not receiving), and enable an RF receiver to receive a downlink Rx signal when the one or more wireless transceivers 678 are not enabled to transmit (e.g., not transmitting).

In other aspects, the one or more wireless transceivers 678 can perform concurrent transmit and receive functions (e.g., performing a sub-band or full-band full-duplex operation). For example, wire the one or more wireless transceivers 678 can enable an RF receiver to receive at or near the same time as it enables an RF transmitter to transmit.

In some cases, the computing system 670 can include a coding-decoding device (or CODEC) configured to encode and/or decode data transmitted and/or received using the one or more wireless transceivers 678. In some cases, the computing system 670 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 678.

The one or more SIMs 674 can each securely store an international mobile subscriber identity (IMSI) number and related key assigned to the user of the electronic device 607. The IMSI and key can be used to identify and authenticate the subscriber when accessing a network provided by a network service provider or operator associated with the one or more SIMs 674. The one or more modems 676 can modulate one or more signals to encode information for transmission using the one or more wireless transceivers 678. The one or more modems 676 can also demodulate signals received by the one or more wireless transceivers 678 to decode the transmitted information. In some examples, the one or more modems 676 can include a WiFi modem, a 4G (or LTE) modem, a 5G (or NR) modem, and/or other types of modems. The one or more modems 676 and the one or more wireless transceivers 678 can be used for communicating data for the one or more SIMs 674.

The computing system 670 can also include (and/or be in communication with) one or more non-transitory machine-readable storage media or storage devices (e.g., one or more memory devices 686), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 686 and executed by the one or more processor(s) 684 and/or the one or more DSPs 682. The computing system 670 can also include software elements (e.g., located within the one or more memory devices 686), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the electronic device 607 can include means for performing operations described herein. The means can include one or more of the components of the computing system 670. For example, the means for performing operations described herein may include one or more of input device(s) 672, SIM(s) 674, modems(s) 676, wireless transceiver(s) 678, output device(s) 680, DSP(s) 682, processors 684, memory device(s) 686, and/or antenna(s) 687.

Figure 7:
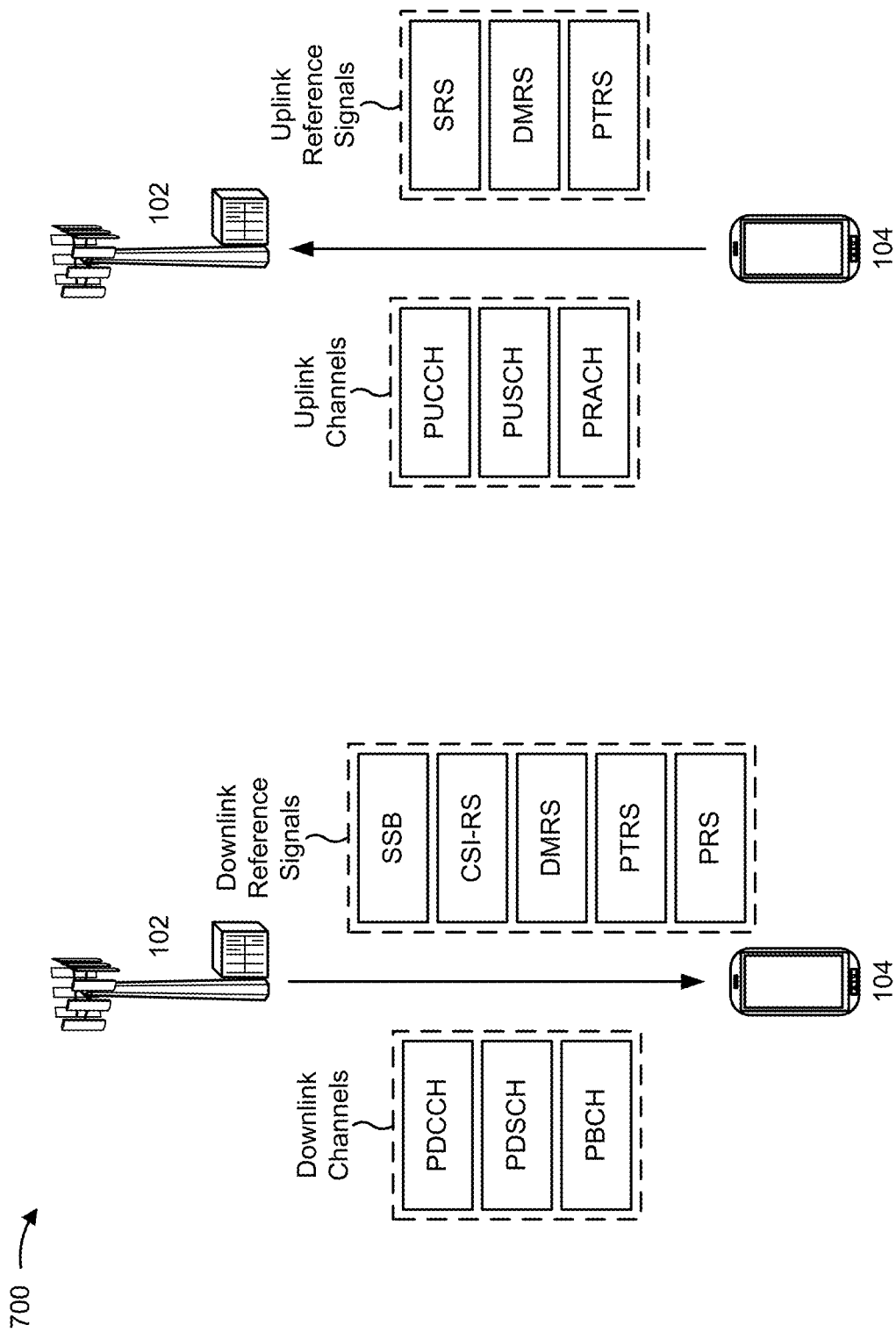
FIG. 7 is a diagram illustrating an example of physical channels and reference signals in a wireless network, in accordance with some examples.

FIG. 7 is a diagram illustrating an example 700 of physical channels and reference signals in a wireless network. In some examples, one or more downlink channels and one or more downlink reference signals may carry information from a base station 102 to a UE 104. One or more uplink channels and one or more uplink reference signals may carry information from UE 104 to base station 102.

In some aspects, a downlink channel may include one or more of a physical downlink control channel (PDCCH) that carries downlink control information (DCI), a physical downlink shared channel (PDSCH) that carries downlink data, and/or a physical broadcast channel (PBCH) that carries system information, among other examples. In some aspects, PDSCH communications may be scheduled by PDCCH communications.

In some examples, an uplink channel may include one or more of a physical uplink control channel (PUCCH) that carries uplink control information (UCI), a physical uplink shared channel (PUSCH) that carries uplink data, and/or a physical random-access channel (PRACH) used for initial network access, among other examples. In some aspects, UE 104 may transmit acknowledgement (ACK) or negative acknowledgement (NACK) feedback (e.g., ACK/NACK feedback or ACK/NACK information) in UCI on the PUCCH and/or the PUSCH.

In some cases, a downlink reference signal may include one or more of a synchronization signal block (SSB), a channel state information (CSI) reference signal (CSI-RS), a demodulation reference signal (DMRS), a positioning reference signal (PRS), and/or a phase tracking reference signal (PTRS), among other examples. In some examples, an uplink reference signal may include one or more of a sounding reference signal (SRS), a DMRS, and/or a PTRS, among other examples.

An SSB may carry or include information used for initial network acquisition and synchronization. For example, an SSB can carry or include one or more of a primary synchronization signal (PSS), a secondary synchronization signal (SSS), a PBCH, and/or a PBCH DMRS. An SSB may also be referred to as a synchronization signal/PBCH (SS/PBCH) block. In some aspects, base station 102 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. For example, base station 102 can configure a set of CSI-RSs for UE 104, and UE 104 can measure the configured set of CSI-RSs. Based on the CSI-RS measurements, UE 104 can perform channel estimation and report channel estimation parameters to base station 102 (e.g., in a CSI report). For example, the channel estimation parameters can include one or more of a channel quality indicator (CQI), a precoding matrix indicator (PMI), a CSI-RS resource indicator (CRT), a layer indicator (LI), a rank indicator (RI), and/or a reference signal received power (RSRP), among other examples.

In some examples, base station 102 can use the CSI report to select transmission parameters for downlink communications to UE 104. For example, base station 102 can use the CSI report to select transmission parameters that include one or more of a quantity of transmission layers (e.g., a rank), a precoding matrix (e.g., a precoder), a modulation and coding scheme (MCS), and/or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS can carry information used to compensate for oscillator phase noise. In some cases, oscillator phase noise may increase as an oscillator carrier frequency increases. In some examples, a PTRS can be utilized at high carrier frequencies (e.g., such as millimeter wave frequencies) to mitigate oscillator phase noise. The PTRS may be used to track the phase of the local oscillator and to enable suppression of phase noise and common phase error (CPE). As illustrated in FIG. 7, in some examples one or more PTRSs can be used for both downlink communications (e.g., on the PDSCH) and uplink communications (e.g., on the PUSCH).

A PRS may carry information associated with timing or ranging measurements of UE 104. For example, UE 104 may utilize one or more signals (e.g., PRSs) transmitted by base station 102 to improve an observed time difference of arrival (OTDOA) positioning performance. In some examples, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). A PRS can be designed to improve detectability by UE 104, which may need to detect downlink signals from multiple neighboring base stations in order to perform OTDOA-based positioning. Accordingly, UE 104 may receive a PRS from multiple cells (e.g., a reference cell and one or more neighbor cells), and may report a reference signal time difference (RSTD) based on OTDOA measurements associated with the PRSs received from the multiple cells. In some aspects, base station 102 can calculate a position of UE 104 based on the RSTD measurements reported by UE 104.

In some examples, an SRS can carry information used for uplink channel estimation, which may be used for scheduling, link adaptation, precoder selection, and/or beam management, among other examples. Base station 102 can configure one or more SRS resource sets for UE 104, and UE 104 can transmit SRSs on the configured SRS resource sets. An SRS resource set may have a configured usage, such as uplink CSI acquisition, downlink CSI acquisition for reciprocity-based operations, uplink beam management, among other examples. Base station 102 may measure the SRSs, may perform channel estimation based on the measurements, and/or may use the SRS measurements to configure communications with UE 104.

As noted previously, physical control channels (e.g., PDCCH, PUCCH, etc.) and reference signals (RSs) can be utilized to perform various network functions (e.g., channel estimation, UL/DL grant, positioning, etc.) but may be transmitted without security protection or security mechanisms to prevent eavesdropping by unauthorized receivers. In some aspects, the systems and techniques described herein can be used to secure PHY layer transmission and signals based on spatial artificial noise (AN) cancellation. For example, a confidential data message can be transmitted by multiple transmitters (e.g., base stations or UEs) to an intended receiver (e.g., another base station or UE), wherein each transmitter generates an AN-impaired transmission based on combining a copy of the data message (or a portion thereof) and an AN signal that is uniquely generated based on CSI of the intended receiver.

Figure 8:
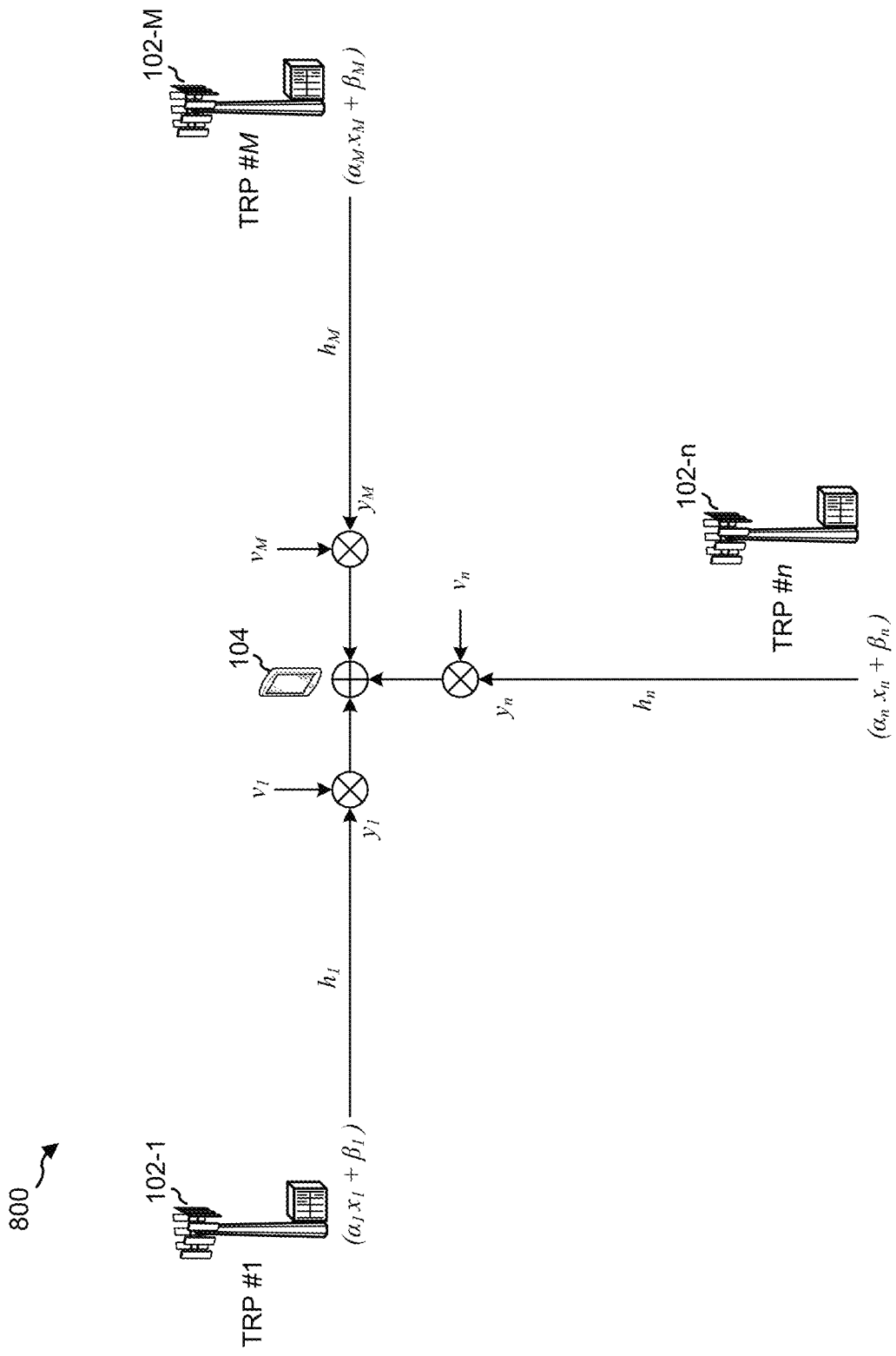
FIG. 8 is a diagram illustrating an example of artificial noise (AN) cancellation associated with multiple transmissions transmitted by one or more wireless nodes to a single-antenna receiver, in accordance with some examples.

FIG. 8 is a diagram illustrating an example of artificial noise (AN) cancellation associated with multiple transmissions transmitted by one or more wireless nodes to a single-antenna receiver, in accordance with some examples. For example, an example network environment 800 can include a plurality of wireless nodes 102 and a receiver 104. In one illustrative example, network environment 800 can include M wireless nodes 102, which are depicted in FIG. 8 as a first wireless node 102-1, an nth wireless node 102-n, and an Mth wireless node (e.g., n<M). In some aspects, the wireless nodes 102 can be provided as base stations, gNBs, UEs, etc. For example, the wireless nodes 102 can be transmit receive points (TRPs). In some examples, the wireless nodes 102 (e.g., also referred to as TRPs 102) can be the same. In some aspects, one or more (or all) of the TRPs 102 can be different (e.g., can be provided as different types of wireless communication device, network node, etc.). In some examples, one or more of the TRPs 102 can be a UE transmitting a sidelink communication.

A receiver 104 can be a UE or other wireless communication device including at least one antenna, antenna array, receive antenna group, etc., for receiving transmissions from the TRPs 102. In some aspects, UE 104 may include a single antenna and RF chain, such that UE 104 can receive only one transmission at a time. In some cases, UE 104 can include multiple antennas but only a single RF chain, such that UE 104 can receive only one transmission at a time.

In one illustrative example, each of the TRPs (e.g., TRPs 102-1, 102-n, 102-M) can generate and transmit an AN-impaired signal to UE 104 that includes an AN signal generated by the respective TRP, and a legitimate data signal. The AN signal generated by the respective TRP can be generated based on CSI of the intended receiver (e.g., UE 104) and combined with the legitimate data signal to generate an AN-impaired signal. The legitimate data signal can be an RS or other physical channel transmission (e.g., PDCCH, PUCCH, etc.).

For example, an nth TRP included in the set of TRPs 102 (e.g., TRP 102-n) can generate an AN-impaired transmission $\alpha_n x_n + \beta_n$, where $\alpha_n$ is a complex transmission coefficient associated with the nth TRP 102-n; $x_n$ is the data signal to be transmitted by the nth TRP 102-n; and $\beta_n$ is the AN signal generated based on the CSI between the nth TRP 102-n and the intended receiver (e.g., UE 104).

Similarly, TRP 102-1 can generate an AN-impaired transmission $\alpha_1 x_1 + \beta_1$, where $\alpha_1$ is a complex transmission coefficient associated with TRP 102-1; $x_1$ is the data signal to be transmitted by TRP 102-1; and $\beta_1$ is the AN signal generated based on the CSI between TRP 102-1 and the intended receiver (e.g., UE 104). As mentioned previously, the set of TRPs used to provide secure PHY signaling based on collaborative AN-cancellation can include a total of M TRPs, wherein the Mth TRP 102-M generates an Mth AN-impaired transmission $\alpha_M x_M + \beta_M$, where am is a complex transmission coefficient associated with the Mth TRP 102-M; $x_M$ is the data signal to be transmitted by the Mth TRP 102-M; and $\beta_M$ is the AN signal generated based on the CSI between the Mth TRP 102-M and the intended receiver (e.g., UE 104).

At each TRP included in the set of TRPs 102 (e.g., 102-1, 102-n, 102-M), the respective AN signal (e.g., $\beta_1$, $\beta_n$, $\beta_M$) can be added to or combined with the legitimate data signal (e.g., $x_1$, $x_n$, $x_M$) in the power domain, and may be transmitted using the same precoder. In some aspects, a same power domain may relate to a transmit power (e.g., total transmit power, nominal transmit power, transmit power allocation, power domain non-orthogonal multiple access (PD-NOMA), etc.) of a transmitter (e.g., from one or more RF chains) to a receiver, and/or as provided in various communication standards (e.g., 3GPP).

In some aspects, the legitimate data signals (e.g., $x_1$, $x_n$, $x_M$) may be the same signal (e.g., multiple copies of the same data message) or may be different signals (e.g., different portions of a same data message). For example, the legitimate data signals (e.g., $x_1$, $x_n$, $x_M$) can be an RS or other physical channel transmission (e.g., PDCCH, PUCCH, etc.), as mentioned previously. The complex transmission coefficients (e.g., $\alpha_1$, $\alpha_n$, $\alpha_M$) can be used by the TRPs 102 (e.g., 102-1, 102-n, 102-M, respectively) to modulate the corresponding legitimate data signal transmitted by the TRP. The complex transmission coefficients $\alpha$ may be determined by the respective TRPs 102-1, 102-n, 102-M and used to optimize detection performance of the intended receiver (e.g., UE 104). For example, the TRPs 102 may determine the complex transmission coefficients as $\alpha_M = h_M$ for maximum-ratio-transmission (MRT) for diversity-combining, where $x_1 = x_2 = \ldots = x_m$ for m=1, 2, ..., M (e.g., where $h_M$ represents an effective channel or channel characteristics of the transmission channel between TRP M and UE 104, described in greater depth below).

The modulated data signal can be combined with the AN signal that is generated using the CSI between the respective TRP and UE 104. For example, the first TRP 102-1 can combine the modulated data signal $\alpha_1 x_1$ with the AN signal to generate the first AN-impaired transmission $\alpha_1 x_1 + \beta_1$; nth TRP 102-n can combine the modulated data signal $\alpha_n x_n$ with the AN signal $\beta_n$ to generate the nth AN-impaired transmission $\alpha_n x_n + \beta_1$; and Mth TRP 102-1 can combine the modulated data signal $\alpha_M x_M$ with the AN signal $\beta_M$ to generate the Mth AN-impaired transmission $\alpha_1 x_1 + \beta_1$.

Each instance of the artificial noise (AN) signal $\beta$ can be used to prevent an unintended or unauthorized receiver (e.g., any receiver or UE other than the intended receiver UE 104) from decoding a corresponding legitimate data signal. For example, the AN signal $\beta_1$ protects the legitimate data signal $x_1$; the AN signal $\beta_n$ protects the legitimate data signal $x_n$; and the AN signal $\beta_M$ protects the legitimate data signal $x_M$.

Each TRP (e.g., 102-1, 102-n, 102-M) can transmit the corresponding AN-impaired transmission by transmitting a directed beam (e.g., $h_1$, $h_n$, and $h_M$) to the intended receiver (e.g., UE 104). In some aspects, each of $h_1$, $h_n$, and $h_M$ may be given as a vector that represents a corresponding antenna port (e.g., a fixed value associated with a corresponding antenna) of the respective TRP 102-1, 102-n, 102-M. For example, each of $h_1$, $h_n$, and $h_M$ may be a complex coefficient of a beam vector corresponding to a receiving beam of the legitimate receiver (e.g., UE 104). In some cases, each of $h_1$, $h_n$, and $h_M$ is a CSI value for a corresponding beam or channel used by the intended receiver UE 104 for receiving the AN-impaired transmissions transmitted by the TRPs 102. In the example of FIG. 8, in which the intended receiver UE 104 includes a single antenna and/or a single RF chain, each of $h_1$, $h_n$, and $h_M$ may be directed to a same receiving point of the intended receiver UE 104.

Each beam (e.g., $h_1$, $h_n$, and $h_M$) can be used to transmit the corresponding AN-impaired transmission that includes the modulated data signal $\alpha_M x_M$ combined with the AN signal $\beta_M$. In some examples, each beam (e.g., $h_1$, $h_n$, and $h_M$) can be used to transmit the corresponding AN-impaired transmission using the same frequency and time resources as used by other beams (e.g., each TRP 102-1, 102-n, 102-M can transmit the corresponding legitimate data signal and the AN signal simultaneously using the same frequency band). In a simultaneous transmission example, spatial separation of the transmitted signals may be achieved based on each TRP transmitting using a different beam (e.g., $h_1$, $h_n$, $h_M$). In some examples, the AN-impaired transmission from different TRPs (e.g., from some or all of TRPs 102-1, 102-n, 102-M) can be multiplexed in time (e.g., using time division duplexing (TDD)) or in frequency (e.g., using frequency division duplexing (FDD)).

At the intended receiver (e.g., UE 104), a received signal can be determined as an aggregate of a plurality of AN-impaired signals transmitted by spatially separated antennas or antenna arrays (e.g., transmitted by multiple TRPs 102). For example, UE 104 can receive a signal $y_1$ from TRP 102-1 using channel $h_1$; a signal a signal $y_n$ from TRP 102-n using channel $h_n$; and a signal $y_M$ from TRP 102-M using channel $h_M$. The received signals (e.g., $y_1$, $y_n$, $y_M$) can be determined as a product of the AN-impaired signal transmitted by a given TRP and the CSI associated with the channel or beam used to transmit the AN-impaired signal. In one illustrative example, because an unintended or unauthorized receiver (e.g., a UE different from UE 104) will be in a different location relative to the intended receiver (e.g., UE 104), each beam used to transmit an AN-impaired signal may be defined by a different complex coefficient (e.g., $\tilde{h}_1$, $\tilde{h}_n$, and $\tilde{h}_M$) from the perspective of the unintended receiver relative to the intended receiver.

Each TRP (e.g., 102-1, 102-n, 102-M) may generate a unique AN signal (e.g., $\beta_1$, $\beta_n$, and $\beta_M$) based on CSI of the intended receiver (e.g., UE 104). An aggregate received signal, y, at the intended receiver (e.g., UE 104) can be defined as the aggregation of the AN-impaired signals transmitted by the TRPs:

$$y = \sum_{n=1}^{M} v_n^* y_n = v_1^* h_1(\alpha_1 x_1 + \beta_1) + \ldots + v_m^* h_m(\alpha_M x_M + \beta_M)$$

Eq. (1)

Here, $v_n^*$ represents a receive filter tap associated with the nth TRP, where n=1, . . . , M. In some aspects, the aggregate received signal y given in Eq. (1) can be generated at UE 104 based on combining the AN-impaired transmission received from each TRP with the respective receive filter tap $v_n^*$ associated with the TRP. For example, UE 104 can combine the AN-impaired transmission received from TRP 102-1 (e.g., $h_1(\alpha_1 x_1 + \beta_1)$) with the respective receive filter tap $v_1^*$ associated with TRP 102-1, etc., Eq. (1) can be rewritten to separate the legitimate data signal components into a combined payload portion and to separate the AN signal components into an aggregated AN portion:

$$y = [v_1^* h_1 \alpha_1 x_1 + \quad . \quad . \quad . \quad + v_m^* h_M \alpha_M x_M] + [v_1^* h_1 \beta_1 + \ldots + v_M^* h_M \beta_M]$$

Eq. (2)

As described previously, each of the AN signals (e.g., $\beta_1$, $\beta_n$, and $\beta_M$) can be generated based on CSI of the intended receiver (e.g., UE 104). For example, the TRPs 102 can compute or generate the AN signals based on the CSI (e.g., $h_M$, for M=1, 2, . . . , n, . . . , M) of each beam used for communication with the intended receiver UE 104. In one illustrative example, the TRPs 102 (e.g., 102-1, 102-n, 102-M) can each generate a respective AN signal such that the contributions of the AN signals (e.g., $\beta_1$, $\beta_n$, and $\beta_M$) are canceled out in the aggregate received signal y at UE 104.

For example, the AN signals β can generated such that the aggregated AN portion included in received signal y (e.g., the second term included in brackets in Eq. (2)) is equal to zero:

$$v_1^* h_1 \beta_1 + \ldots + v_M^* h_M \beta_M = 0$$

Eq. (3)

Letting $v_n^* h_n \beta_n = e^{j\theta_n}$, with $$\theta_n = (n-1)\frac{2\pi}{M} + \varphi,$$

Eq. (3) can be rewritten as follows:

$$v_1^* h_1 \beta_1 + \ldots + v_M^* h_M \beta_M = \sum_{n=1}^{M} e^{j\theta_n} = 0$$

Eq. (4)

Here, n is an index of a TRP included in the set of M TRPs 102; $\theta_n$ is a phase of the signal transmitted by the nth TRP; and n=1, 2, . . . , M.

For the soft combining of the received signals in Eqs. (1) and (2) to automatically cancel out the AN signal portion given in Eq. (3), each of the M AN signals (e.g., $\beta_1$, $\beta_n$, and $\beta_M$) can be generated based on a corresponding CSI value (e.g., $h_1$, $h_n$, $h_M$) of the intended receiver UE 104, as follows:

$$\beta_n = \frac{e^{j\theta_n}}{v_n^* h_n} u, \text{ with } \theta_n = (n-1)\frac{2\pi}{M} + \varphi,$$

Eq. (5)

Here, u is a random noise term common to or shared between the set of TRPs 102. For example, u can be a noise kernel, a pseudo-random noise, an artificial noise, etc., that is used as a common input for the TRPs 102 to generate the respective AN signals $\beta_n$ as given by Eq. (5) above. φ is a rotation angle that may also be used as a common input to Eq. (5) used by all of the TRPs 102 in generating the respective AN signals $\beta_n$. In some aspects, the random noise u and the rotation angle φ can be common for all n, where n=1, . . . , M. In one illustrative example, the random noise u and the rotation angle φ can be selected, configured, or communicated to the TRPs 102 by a network that includes the TRPs 102.

It is noted that the aggregated AN signals will not zero out or cancel out at an unintended receiver (e.g., a UE other than UE 104) even if the aggregated AN signals are soft combined by the unintended receiver. For example, because the unintended receiver has different CSI than the UE 104, $h_n \neq \tilde{h}_n$ for any value of n. Moreover, in some aspects, even if an unintended receiver knew the CSI of the intended receiver (e.g., UE 104), the spatial dimensions of $\tilde{h}_m$ (e.g., CSI of the unintended receiver) may prevent the unintended receiver from being able to cancel out the AN signals to recover the legitimate data signals (e.g., $x_n$).

In some aspects, the receive coefficients (e.g., $v_1^*$, $v_n^*$, $v_M^*$) can be selected or determined by the TRPs 102 to maximize decoding performance of the data signals $x_1$, $x_n$, $x_M$ at the intended receiver UE 104. In some examples, the complex transmission coefficients $\alpha_1$, $\alpha_n$, $\alpha_M$ can additionally be selected or determined by the TRPs 102 to maximizing decoding performance of the data signals $x_1$, $x_n$, $x_M$ at the intended receiver UE 104. For example, the complex transmission coefficients α can function like a precoder for a single-antenna TRP to reduce or control channel fading. In some cases, the complex transmission coefficients α can be used to adjust a power split between a data signal portion (e.g., the combined payload portion of Eq. (2)) and an AN portion (e.g., the aggregate AN portion of Eq. (2)) in the AN-impaired transmission $y_1$, $y_n$, $y_M$.

In some aspects, one or more (or all) of the TRPs 102 (e.g., 102-1, 102-n, 102-M) can include a single antenna, wherein the single antenna is associated with a respective RF chain for transmitting the AN-impaired transmission generated by each TRP. In some aspects, one or more (or all) of the TRPs 102 can include multiple antennas with a single RF chain. In such a scenario, then the effective channel term $h_n$ can be indicative of the impact of a precoder as well (e.g., $h_n = w_n^H h_n$, where $w_n^H$ is the precoder vector and $h_n$ is the channel vector). In some aspects, one or more (or all) of the TRPs 102 can include multiple antennas with multiple RF chains. In such a scenario, transmissions via each RF chain of a given TRP can be treated as a transmission via a separate TRP.

As mentioned previously, the AN-impaired transmissions $y_1$, $y_n$, $y_M$ can be received at UE 104 as multiplexed signals in time or frequency (e.g., TDD, FDD, etc.). For example, multiplexed TDD or FDD signals can be combined using the receive filter taps $v_1$, $v_n$, $v_M$ associated with each respective TRP 102-1, 102-n, 102-M in order to obtain the combined signal y described above with respect to Eqs. (1) and (2).

In some examples, the AN-impaired transmissions $y_1$, $y_n$, $y_M$ can be received at UE 104 within the same time slot and frequency band. In such an example, the receive filter taps $v_1$, $v_n$, $v_M$ can be the same (e.g., $v_1 = v_n = v_M$). In one illustrative example, when the AN-impaired transmissions are received within the same time slot and frequency band, the receive filter taps can all be one (e.g., $v_1 = v_n = v_M = 1$).

In one illustrative example, the TRPs 102 (e.g., 102-1, 102-n, 102-M) can be used to perform multiple TRP (mTRP) assisted AN cancellation based on one or more pre-configured parameters. For example, the TRPs 102 can be configured with the common random noise u and the rotation angle φ used to generate each TRP-specific AN signal $\beta_n$ (e.g., as given by Eq. (5)), can be configured with time and frequency info such that each TRP uses the proper time slot and frequency band for implementing TDD or FDD transmission of the AN-impaired signals $y_n$, and/or can be configured with an index value n that is assigned to each respective TRP included in the set of TRPs 102. In some aspects, the index value n can be assigned to a given TRP 102 by a network in which the TRP is included, participates in, or otherwise communicates with.

In some aspects, the TRPs 102 may additionally be configured with a total quantity or number of TRPs (e.g., M) that are participating in a given AN cancellation instance with UE 104. For example, a given TRP n can generate its TRP-specific AN signal $\beta_n$ based on obtaining configured or pre-determined values for the assigned index n of the given TRP, the total quantity M of participating TRPs, and the rotation angle $\varphi$ (e.g., using these parameters, the given TRP can determine $\beta_n$, of Eq. (5) and may subsequently use $\theta_n$ to determine the TRP-specific AN signal $\beta_n$, as also given by Eq. (5)). In some aspects, the TRPs 102 can receive one or more signals from the intended receiver UE 104 for generating the TRP-specific AN signals $\beta_1$, $\beta_n$, $\beta_M$. For example, each of the TRPs 102 can receive its CSI information and/or can receive the receiver filter (e.g., combiner) tap information for itself (e.g., a respective one of $v_1$, $v_n$, $v_M$) from UE 104.

In one illustrative example, the systems and techniques described herein can be used to provide low latency AN cancellation using multiple TRPs. For example, the multiple TRPs (e.g., TRPs 102-1, 102-n, 102-M) can each transmit in a same time slot using a different frequency and/or spatial resource, such that the receiver UE 104 does not need to wait for all of the AN-impaired signals to arrive before being able to soft combine the AN-impaired signal received from each TRP in order to cancel or zero out the contribution of the AN signal components $\beta$.

In some aspects, soft combining of the AN-impaired signals $y_1$, $y_n$, $y_M$ (e.g., by intended receiver UE 104) can be performed to eliminate the AN contribution (e.g., per Eq. (3)), as described previously. Additionally, soft combining of the AN-impaired signals $y_1$, $y_n$, $y_M$ can improve a Signal-to-Noise Ratio (SNR) and/or a Signal-to-Interference-plus-Noise-Ratio (SINR) associated with detecting or decoding the legitimate data message signal x at the intended receiver UE 104. For example, SNR and/or SINR can be improved based on the UE 104 receiving multiple copies of the same data message x (e.g., decoded from each of the AN-impaired signals $y_1$, $y_n$, $y_M$ after soft combining to perform AN cancellation). In some examples, based on the expected SNR and/or SINR increase from the soft combining performed at UE 104, the TRPs 102 can be configured to use a larger code rate to use a lesser quantity or amount of time and/or frequency resources.

For example, using a larger code rate at one or more (or all) of the TRPs 102 may be associated with a decrease in error performance, which can be compensated by the increase in SNR/SINR based on UE 104 soft combining the multiple copies (e.g., $x_1$, $x_n$, $x_M$) of the data message. In some aspects, when the data message is a PDCCH, a smaller aggregation level (AL) can be selected or otherwise utilized to lower the quantity of resource blocks (RBs) that are used. For example, instead of using AL=2 to carry a DCI in a single PDCCH block, two TRPs implementing the systems and techniques described herein for multi-TRP AN cancellation can each transmit the same DCI using AL=1.

In some aspects, the increased SNR/SINR at the intended receiver UE 104 (e.g., based on soft combining the AN-impaired signals $y_1$, $y_n$, $y_M$) can be utilized such that one or more (or all) of the TRPs 102 allocate less power to the confidential data message copies (e.g., $x_1$, $x_n$, $x_M$) and allocate more power to the AN signal (e.g., $\beta_1$, $\beta_n$, and $\beta_M$). By allocating less power to the data message x and more power to the AN signal $\beta$, the probability of the data message x being intercepted can be decreased (e.g., low-probability interception can be achieved or provided).

For example, a power split between the data message x and the AN signal $\beta$ can be adjusted on a per-transmission basis. In some examples, the power split can be adjusted based on the intended receiver UE 104's quality of service (QoS) and/or security requirements. The power split may additionally, or alternatively, be adjusted based on channel quality information (CQI) (e.g., as a tradeoff between secure transmission v. throughput). As mentioned previously, the complex transmission coefficients $\alpha_1$, $\alpha_n$, $\alpha_M$ can be used to adjust a power split between a data signal portion (e.g., the combined payload portion of Eq. (2)) and an AN portion (e.g., the aggregate AN portion of Eq. (2)) in the AN-impaired transmissions $y_1$, $y_n$, $y_M$.

In some aspects, the confidential data messages (e.g., $x_1$, $x_n$, $x_M$) transmitted by each TRP 102 can be the same (e.g., copies of the same data message, RS, PDCCH, PUCCH, etc.). In some examples, the confidential data messages can be different. For example, the confidential data messages may be related, in which the confidential data messages $x_1$, $x_n$, $x_M$ include overlapping portions of an underlying, same data message. The confidential data messages may also be different from one another, in which the confidential data messages $x_1$, $x_n$, $x_M$ include non-overlapping portions of an underlying, same data message. In some examples, one or more of the TRPs 102 may transmit only the AN signal $\beta$ without any confidential data message (e.g., the AN-impaired transmission y for the TRP does not include any data signal x). In some aspects, the use of one or more TRPs 102 to transmit only an AN signal $\beta$ may be transparent to the intended receiver UE 104 (e.g., the intended receiver UE 104 does not need to change the receive filter tap v for the given TRP that transmit only an AN signal $\beta$).

In some aspects, the confidential data messages $x_1$, $x_n$, $x_M$ may be independent of one another. In some examples, the confidential data messages $x_1$, $x_n$, $x_M$ can be arranged (e.g., by the intended receiver UE 104) to form a larger message. For example, a single PDCCH may be sent securely using the multi-TRP AN cancellation described herein by partitioning the single PDCCH into a set of confidential data messages $x_1$, $x_n$, $x_M$.

In some aspects, some but not all of the data signals $x_1$, $x_n$, $x_M$ may be transmitted as confidential data signals. For example, a first portion of the data signals can be transmitted as confidential, AN-impaired transmissions (e.g., a first portion of the data signals can be combined with TRP-specific AN signals $\beta$). A second portion of the data signals can be transmitted as non-confidential transmission that are not combined with an AN signal.

In one illustrative example, when the confidential messages are all the same (e.g., $x=x_1=x_n=x_M$), an optimal output SNR can be obtained via maximal-ratio combining (MRC) of the signals arriving (e.g., at the intended receiver UE 104) in different time slots (e.g., when TDD is used to multiplex the signals) or different frequency bands (e.g., when FDD is used to multiplex the signals):

$$v_n^* = h_n^* \rightarrow v_1^* h_1 \alpha_1 x_1 + \quad . \quad . \quad . \quad + v_M^* h_M \alpha_M x_M = (\alpha_1 |h_1|^2 + \ldots + \alpha_M |h_M|^2) x \quad \text{Eq. (6)}$$

$$v_1^* h_1 \beta_1 + \quad . \quad . \quad . \quad + v_M^* h_M \beta_M = |h_1|^2$$
$$\beta_1 + \ldots + |h_M|^2 \beta_M = e^{j\theta_1} + \ldots + e^{j\theta_M} = 0 \text{ if}$$
$$\beta_m u e^{j\theta_m}/|h_m|^2 \quad \text{Eq. (7)}$$

In some aspects, if all of the TRPs 102 are transmitting the same message x using the same time slot and frequency band (e.g., neither TDD nor FDD are used), the signals received by UE 104 from each of the TRPs 102 cannot be weighted by different receive filter taps, and $v_1 = v_n = v_M = 1$. In such a scenario, diversity combining can be implemented such that the complex coefficients $\alpha_1$, $\alpha_n$, $\alpha_M$ are determined or selected based on maximum-ratio-transmission (MRT) (e.g., $\alpha_m = h_m^*$):

$$v_1^* h_1 \alpha_1 x_1 + \ldots + v_M^* h_M \alpha_M x_M = (|h_1|^2 + \ldots + |h_M|^2) x \qquad \text{Eq. (8)}$$

$$v_1^* h_1 \beta_1 + \ldots + v_M^* h_M \beta_M = h_1 \beta_1 + \ldots + h_M \beta_M = e^{j\Theta_1} + \ldots + e^{j\Theta_M} = 0 \text{ if } \beta_m = u e^{j\Theta_m}/h_m \qquad \text{Eq. (9)}$$

Figure 9:
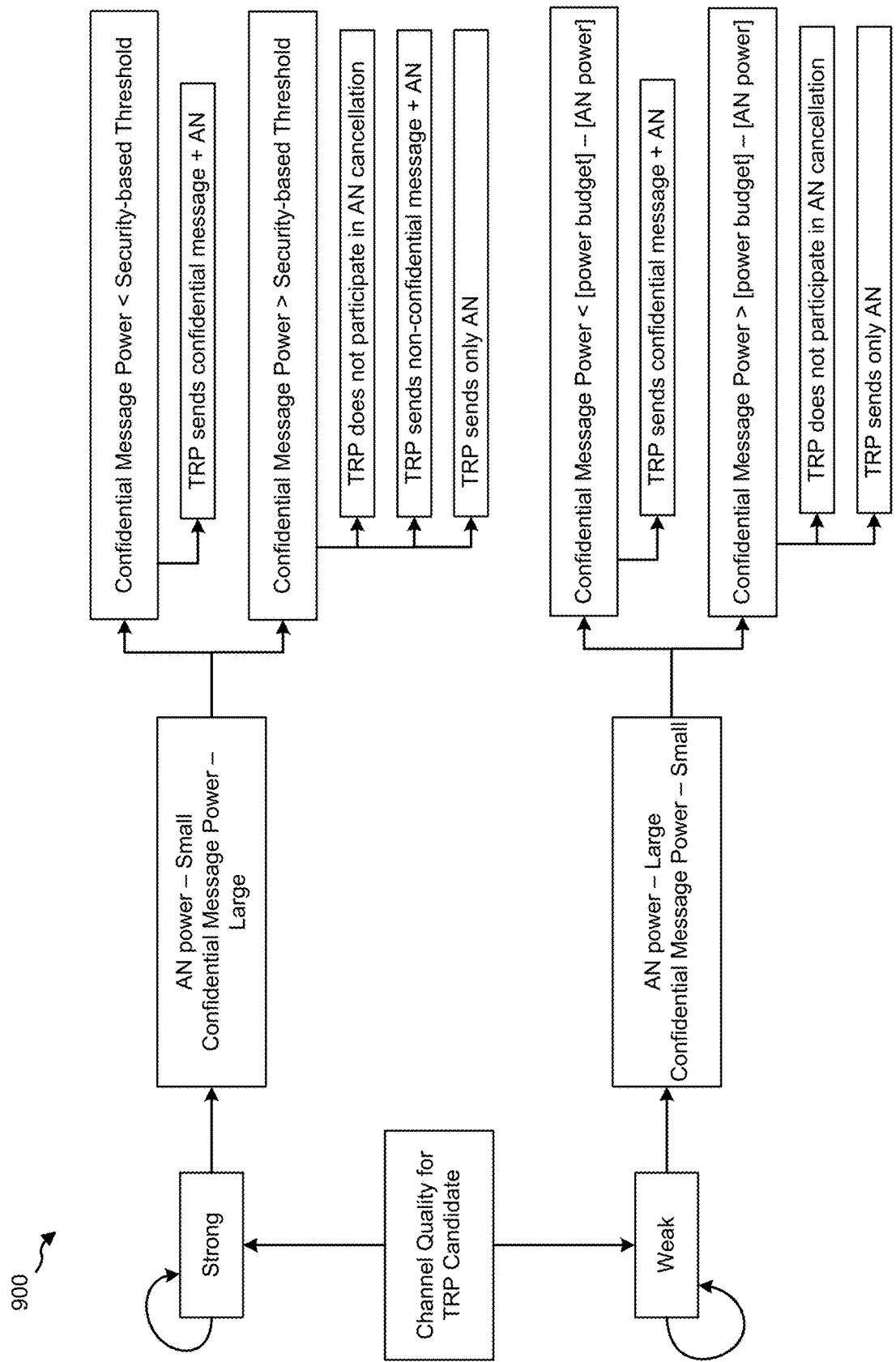
FIG. 9 is a flow diagram illustrating an example of a process for performing AN cancellation based on a channel quality of a transmit receive point (TRP) candidate, in accordance with some examples.

In some aspects, the systems and techniques can select the set of TRPs 102 used for multi-TRP AN cancellation from a plurality of candidate TRPs. For example, FIG. 9 is a flow diagram 900 illustrating an example of a process for performing AN cancellation based on a channel quality of a TRP candidate. In one illustrative example, a candidate TRP may be associated with a strong channel quality (e.g., $|h_n|$ is relatively large) or a poor or weak channel quality (e.g., $|h_n|$ is relatively small).

In some aspects, a candidate TRP determined to have a strong channel quality can be used to perform AN cancellation wherein the magnitude (e.g., power) of the AN signal generated by the candidate TRP (e.g., $|\beta_n|$) is relatively small. For example, a candidate TRP associated with a strong channel quality can generate a relatively low-power AN signal $\beta_n$ based on $\beta_n = (e^{j\Theta_n}/v_n^* h_n) u$, as described above with respect to Eq. (5).

When the power allocated to the AN signal $\beta_n$ is relatively small, the power allocated to the confidential data message $x_n$ can be relatively large (e.g., under a fixed power budget of the candidate TRP, when the AN signal $\beta_n$ is relatively low power, the confidential data message $x_n$ can use a corresponding relatively higher power).

In some aspects, a power associated with the confidential data message $x_n$ may be maintained to be less than or equal to a security-based threshold that is determined such that the confidential data message $x_n$ will be effectively hidden (e.g., secured) based on being combined with the AN signal $\beta_n$ when the candidate TRP generated its AN-impaired transmission. For example, the AN signal $\beta_n$ can be used to hide or secure the confidential data message $x_n$ based on the AN signal being used to intentionally deteriorate the SNR or SINR of the confidential data message $x_n$ that is included or represented in the AN-impaired transmission generated by the candidate TRP. If the power of the confidential data message $x_n$ is too high (e.g., relative to the power of the AN signal $\beta_n$), the SNR deterioration associated with combining the confidential data message $x_n$ with the AN signal $\beta_n$ may not suitably hide or secure the confidential data message $x_n$.

As illustrated in FIG. 9, for a candidate TRP associated with a relatively strong channel quality, the candidate TRP may be selected to generate an AN-impaired transmission using a relatively small AN signal power and a relatively large confidential message power. When the confidential message power is less than a pre-determined security-based threshold (e.g., as described above), the candidate TRP can be configured to generate and transmit an AN-impaired transmission that includes a confidential message $x_n$ combined with an AN signal $\beta_n$.

When the confidential message power is greater than or equal to the security-based threshold, the candidate TRP may not be selected for AN cancellation (e.g., the TRP does not participate in AN cancellation); the candidate TRP can be selected for AN cancellation in which the candidate TRP sends a non-confidential message combined with an AN signal $\beta_n$ or the candidate TRP can be selected and configured to transmit only an AN signal $\beta_n$.

In some examples, when a candidate TRP is determined to be associated with a relatively poor or weak channel quality (e.g., $|h_n|$ is relatively small), the candidate TRP can be selected to generate an AN-impaired transmission using a relatively large AN signal power and a relatively small confidential message power. If the confidential message power is less than a power budget associated with the candidate TRP minus the AN signal power (e.g., confidential message power<[power budget]−[AN power]), then the candidate TRP can be selected and configured to generate and transmit an AN-impaired transmission that includes a confidential message $x_n$ combined with an AN signal $\beta_n$.

If the power of the confidential message needs to be greater than the remaining power for the candidate TRP (e.g., is greater than the candidate TRP power budget−the AN signal power), then the candidate TRP may not be selected for AN cancellation or may be selected and configured to transmit only an AN signal. For example, when the confidential message power exceeds the candidate TRP power budget minus the AN signal power (e.g., confidential message power>[power budget]−[AN power]), the candidate TRP either does not participate in AN cancellation or the candidate TRP is configured to transmit only an AN signal $\beta_n$.

In one illustrative example, the channel quality of a given TRP or candidate TRP can be determined based on already existing or already available reports and reporting information. For example, the channel quality of a given TRP or candidate TRP can be determined based on CQI reports, etc. In some aspects, a channel quality of a given TRP or candidate TRP can be estimated based on a distance between the TRP or candidate TRP and the intended receiver (e.g., UE 104).

Figure 10:
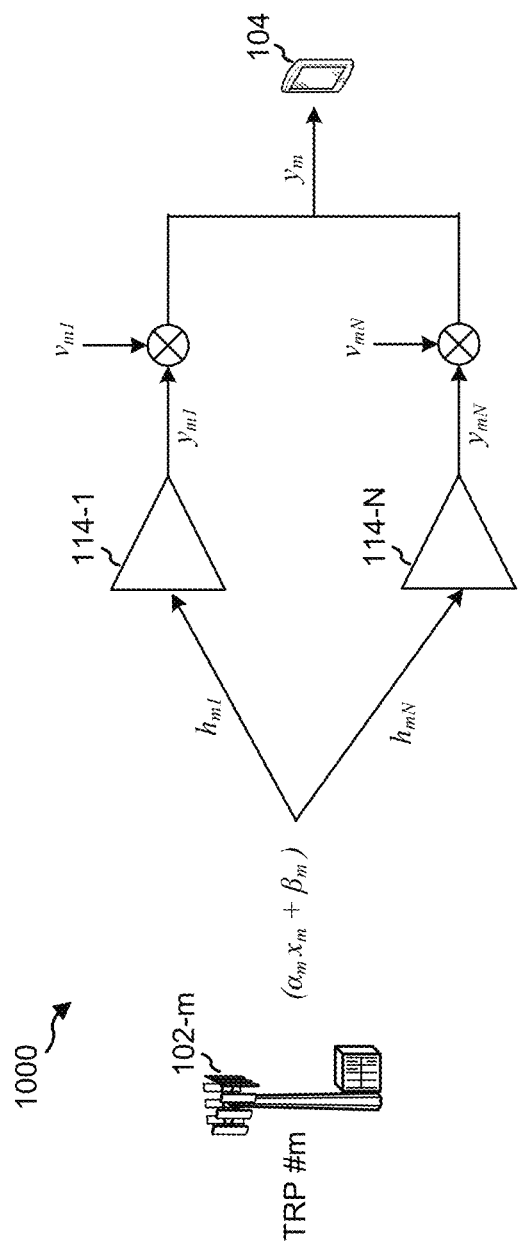
FIG. 10 is a diagram illustrating an example of AN cancellation associated with multiple transmissions trans

In some aspects, the systems and techniques can be used to perform multi-TRP AN cancellation for an intended receiver UE that includes multiple antennas and/or RF chains. For example, FIG. 10 is a diagram illustrating an example of AN cancellation associated with multiple AN-impaired transmissions transmitted by one or more wireless nodes (e.g., TRP 1000) to a multi-antenna receiver (e.g., UE 104). In some cases, the example network environment 1000 illustrated in FIG. 10 can be the same as or similar to the example network environment 800 illustrated in FIG. 8. For example, TRP 102-m can be the same as or similar to one or more of the TRPs 102-1, 102-n, and/or 102-M described previously.

The example network environment 1000 illustrates a single TRP 102-m for purposes of clarity of illustration and explanation, although it is noted that multiple TRPs may also be utilized to transmit AN-impaired transmissions to an intended receiver with multiple antennas (e.g., such as UE 104 illustrated in FIG. 10).

As illustrated, the intended receiver (e.g., UE 104) can include a first antenna or receive antenna group 114-1 and an Nth antenna or receive antenna group 114-N, for a total of N antennas or receive antenna groups. A given TRP (e.g., TRP 102-m) can generate and transmit an AN-impaired transmission $\alpha_m x_m + \beta_m$ as was described above with respect to FIG. 8. The AN-impaired transmission can be received by some (or all) of the N antennas associated with the intended receiver (e.g., UE 104).

Each of the N antennas may be associated with its own CSI to TRP 102-m. For example, first antenna 114-1 can be associated with $h_{m1}$ and Nth antenna 114-N can be associated with $h_{mN}$. The signal received at first antenna 114-1 is $y_{m1}=h_{m1}(\alpha_m x_m+\beta_m)$. The signal received at Nth antenna 114-N is $y_{mN}=h_{mN}(\alpha_m x_m+\beta_m)$.

The signal $y_{mn}$ received at a given antenna n, for n=1, . . . , N can be combined with a corresponding receive filter tap win (e.g., in a manner the same as or similar to that described above with respect to FIG. 8 and the receive filter taps $v_1$, $v_n$, $v_M$ combined with the corresponding received signals $y_1$, $y_n$, $y_M$).

The multi-antenna intended receiver UE 104 can use the multiple antennas 114-1 through 114-N to determine a received signal from a given TRP m (e.g., TRP 102-m) as follows:

$$y_m = \Sigma_{n=1}^{N} v_{mn}^* y_{mn} = (\alpha_m x_m + \beta_m)[v_{m1}^* h_{m1} + \ldots + v_{mN}^* h_{mN}] \quad \text{Eq. (10)}$$

Here, $v_{mn}^*$ represents the receive filter tap for a signal received at antenna n and transmitted by a TRP m. Eq. (10) can be simplified as:

$$y_m = (\alpha_m x_m + \beta_m)\Sigma_{n=1}^{N} v_{mn}^* h_{mn} \quad \text{Eq. (11)}$$

Here, $y_m$ represents the received single determined by UE 104 for a single TRP m (e.g., TRP 102-m). As mentioned previously, UE 104 may receive AN-impaired transmissions from a plurality of TRPs. The AN-impaired transmission y can be determined for each TRP of a plurality of TRP as described above with respect to Eqs. (10) and (11), and subsequently soft combined at UE 104 to cancel out or remove the contribution of the AN signals and obtain (e.g., decode) the confidential data message (e.g., as was described above with respect to FIG. 8). For example, a combined received signal from all TRPs transmitting to the intended receiver UE 104 can be given as:

$$y = \Sigma_{m=1}^{M} w_m^* y_m = \Sigma_{m=1}^{M} \Sigma_{n=1}^{N} v_{mn}^* w_m^* h_{mn}(\alpha_m x_m + \beta_m) \quad \text{Eq. (12)}$$

Here, $w_m^*$ represents a weight (e.g., precoder weight) assigned to or associated with the aggregated signal received by UE 104 from the mth TRP. Eq. 12 can be rewritten to separate the combined received signal y into a combined payload portion (e.g., representing the confidential data message) and an aggregated AN portion (e.g., representing the contribution of the AN signals $\beta_m$ generated by each TRP:

$$y = [\Sigma_{m=1}^{M}\Sigma_{n=1}^{N} v_{mn}^* w_m^* h_{mn}\alpha_m x_m] + [\Sigma_{m=1}^{M}\Sigma_{n=1}^{N} v_{mn}^* w_m^* h_{mn}\beta_m] \quad \text{Eq. (13)}$$

The aggregated AN portion is represented as the bracketed expression on the right-hand side of Eq. (13) and the combined payload portion is represented as the bracketed expression on the left-hand side of Eq. (13). The aggregated AN portion of Eq. (13) can be rewritten as:

$$\Sigma_{m=1}^{M}\Sigma_{n=1}^{N} v_{mn}^* w_m^* h_{mn}\beta_m = (\Sigma_{n=1}^{N} v_{1n}^* w_1^* h_{1n})\beta_1 + \ldots + (\Sigma_{n=1}^{N} v_{Mn}^* w_M^* h_{Mn})\beta_M \quad \text{Eq. (14)}$$

AN cancellation can be performed based on the aggregated AN contribution included in the combined received signal y being equal to zero (e.g., based on the AN contributions from each of the m TRPs cancelling each other out). The aggregated AN term of Eq. (14) becomes equal to zero for:

$$\left(\Sigma_{n=1}^{N} v_{mn}^* w_m^* h_{mn}\right)\beta_m = e^{j\theta_m}, \text{ with } \theta_m = (m-1)\frac{2\pi}{M} + \varphi \quad \text{Eq. (15)}$$

Here, φ is a rotation angle used by the TRPs to generate a respective TRP-specific AN signal (e.g., as described above with respect to FIG. 8).

Based on Eq. (15), each TRP can determine an AN signal $\beta_m$ for providing AN cancellation when the respective AN-impaired signals (e.g., generated by each TRP using the respective TRP-specific AN signal $\beta_m$) are soft combined at UE 104 according to Eq. (13). In one illustrative example, based on Eq. (15), each TRP can generate a TRP-specific AN signal $\beta_m$ for providing AN cancellation, as follows:

$$\beta_m = \frac{e^{j\theta_m}}{\sum_{n=1}^{N} v_{mn}^* w_m^* h_{mn}} u \quad \text{Eq. (16)}$$

In some aspects, AN cancellation associated with an intended receiver that includes a single antenna (e.g., as illustrated in FIG. 8) can be similar to AN cancellation associated with an intended receiver that includes multiple antennas (e.g., as illustrated in FIG. 10). In some examples, when a multi-antenna receiver is used, a TRP (e.g., TRP 102-m) may generate an AN signal that depends on both $v_{mn}^*$ (e.g., the receive filter tap for the signal received at the nth antenna of the intended receiver and transmitted by the mth TRP) and $w_m^*$ (e.g., the weight for the aggregated signal received from the mth TRP, as given by Eq. (12)).

In one illustrative example, the intended receiver UE 104 can provide information of both filters to each TRP such that the TRP can generate the TRP-specific AN signal $\beta_m$ of Eq. (16), as $\beta_m$ is generated based on both the receive filter tap $v_{mn}^*$ and the weight $w_m^*$.

For example, the TRP 102-m illustrated in FIG. 10 can generate or otherwise determine its respective TRP-specific AN signal $\beta_m$ based on receiving its own CSI for each antenna of the intended receiver UE 104 (e.g., $h_{m1}$, . . . , $h_{mN}$), the combiner taps associated with each antenna (e.g., $v_{m1}$, . . . , $v_{mN}$), and its weight (e.g., $w_m$). In some aspects, one or more (or all) of the CSI information for each antenna 114, the combined tap information for each antenna 114, and/or the weight for TRP 102-m can be transmitted by the intended receiver UE 104 to the TRP 102-m.

Figure 11:
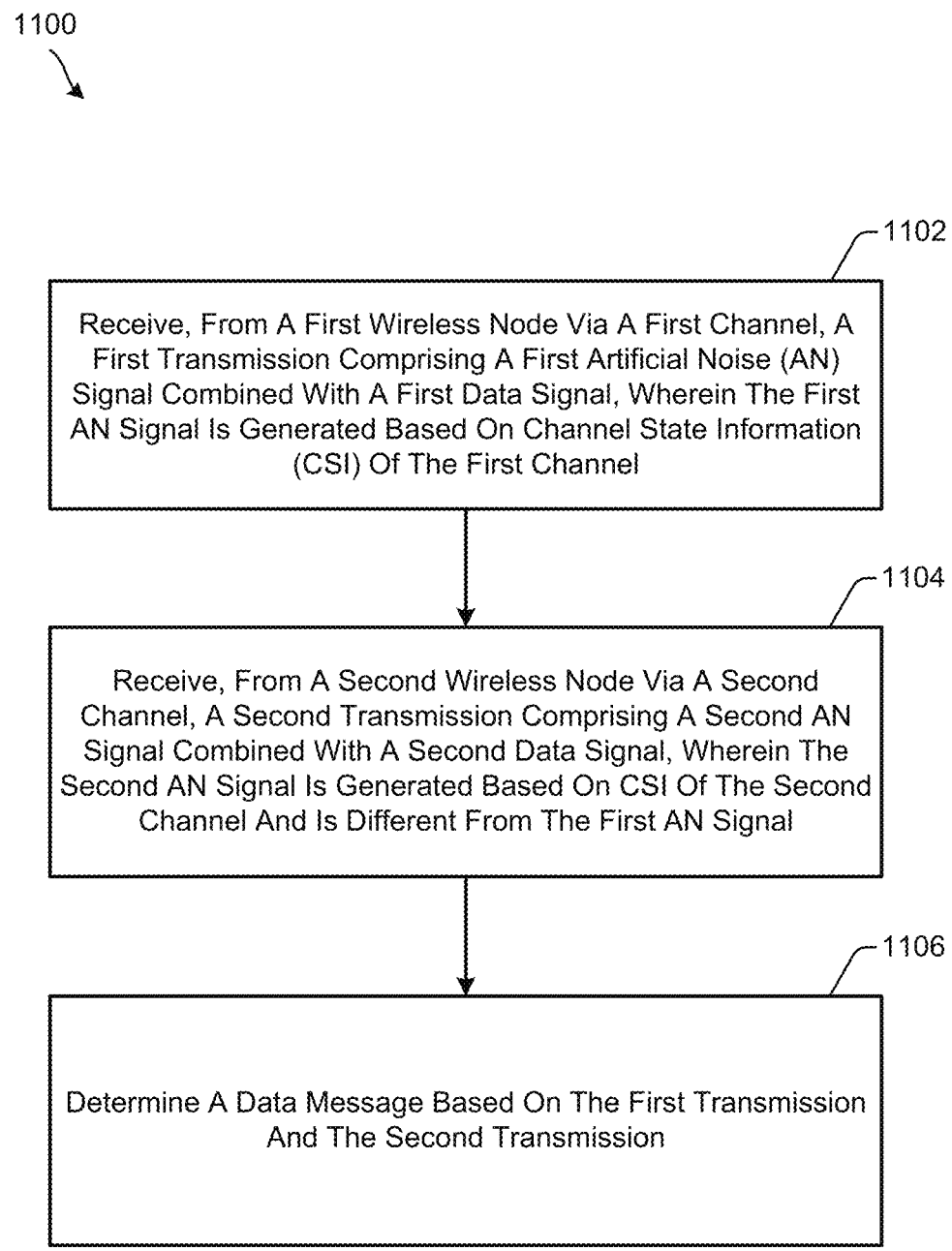
- FIG. 11 is a flow diagram illustrating an example of a process for wireless communications at a user equipment (UE), in accordance with some examples.

FIG. 11 is a flowchart diagram illustrating an example of a process 1100 for wireless communications at a user equipment (UE). At block 1102, the process 1100 includes receiving, from a first wireless node via a first channel, a first transmission comprising a first artificial noise (AN) signal combined with a first data signal, wherein the first AN signal is generated based on channel state information (CSI) of the first channel. For example, the UE can be the same as or similar to one or more of the UEs 104 illustrated in FIGS. 1 and 2, the UEs 320 illustrated in FIG. 3, the electronic device 607 illustrated in FIG. 6, the UEs 104 illustrated in FIG. 7, the UE 104 illustrated in FIG. 8, the UE 104 illustrated in FIG. 10, etc.

In some examples, the first wireless node can be the same as or similar to one or more of the base stations 102, 180 illustrated in FIG. 1, the base station 102 illustrated in FIG. 2, the O-RAN illustrated in FIG. 3, the base stations 102 illustrated in FIG. 7, etc. In some aspects, the first wireless node can be a first transmit-receive point (TRP) and may be the same as or similar to one or more of the TRPs 102-1, 102-n, 102-M illustrated in FIG. 8 and/or may the same as or similar to TRP 102-m illustrated in FIG. 10.

In some examples, the first AN signal can be the same as or similar to the AN signals β illustrated in FIG. 8 and/or FIG. 10 (e.g., $\beta_1$, $\beta_n$, $\beta_M$ illustrated in FIG. 8 and/or $\beta_m$ illustrated in FIG. 10). For example, the first AN signal β can be combined with a first data signal x (e.g., $x_1$, $x_n$, $x_M$ illustrated in FIG. 8 and/or $x_m$ illustrated in FIG. 10) to generate or otherwise obtain the first transmission.

In some examples, the first AN signal can be generated based on CSI of the first channel between the UE and the first wireless node (e.g., first TRP). For example, the CSI can be the same as or similar to the CSI information/effective channel information h illustrated in FIG. 8 and/or FIG. 10 (e.g., $h_1$, $h_n$, $h_M$ illustrated in FIG. 8 and/or $h_{m1}$, $h_{mN}$ illustrated in FIG. 10). In some cases, the first AN signal can be generated based on the CSI $h_1$ of the first channel and a first filter coefficient associated with a receive antenna group of the UE. For example, the first AN signal can be an AN-impaired transmission $\alpha_1 x_1 + \beta_1$, wherein $\alpha_1$ (e.g., as illustrated in FIG. 8) represents the first filter coefficient associated with the receive antenna group of the UE. In some cases, the first channel can be associated with a first receive antenna group of the UE and a second channel (e.g., described below) can be associated with a second receive antenna group of the UE.

In some examples, the first AN signal can be generated based on the CSI of the first channel and a first filter coefficient, wherein the first filter coefficient is associated with the first wireless node (e.g., first TRP) and the first receive antenna group of the UE. In some cases, a second AN signal can be generated based on CSI of a second channel and a second filter coefficient, wherein the second filter coefficient is associated with a second wireless node (e.g., second TRP) and a second receive antenna group of the UE (e.g., as will be described in greater depth below).

At block 1104, the process 1100 includes receiving, from a second wireless node via a second channel, a second transmission comprising a second AN signal combined with a second data signal, wherein the second AN signal is generated based on CSI of the second channel and is different from the first AN signal. In some examples, the second transmission can be generated in a manner the same as or similar to the first transmission described above with respect to block 1102. For example, the first transmission can be a first AN-impaired transmission $\alpha_1 x_1 + \beta_1$ received by the UE from a first TRP (e.g., TRP #1, 102-1 illustrated in FIG. 8) and the second transmission can be a second AN-impaired transmission AN-impaired transmission $\alpha_n x_n + \beta_n$ received by the UE from a second TRP (e.g., TRP #n, 102-n illustrated in FIG. 8).

In some cases, the first AN signal is generated based on the CSI of the first channel and a first filter coefficient associated with a receive antenna group of the UE, and the second AN signal is generated based on the CSI of the second channel and a second filter coefficient associated with the receive antenna group of the UE, wherein the second filter coefficient is different from the first filter coefficient.

In some examples, the first AN signal and the second AN signal may be generated using a same pseudo-random noise and a same rotation angle. For example, the first AN signal and the second AN signal can be generated using a common random noise u and a rotation angle φ, as described above with respect to FIG. 8 and/or FIG. 10. In some examples, the first AN signal and the second AN signal can be further generated based on a quantity of wireless nodes (e.g., TRPs) used for transmission of at least a portion of the data message impaired by an AN signal. For example, the first and second AN signal can be generated based on the quantity M of TRPs, as described with respect to FIG. 8 above. In some cases, the first and second AN signal can be generated based on $\beta_n$ and $\theta_n$ of Eq. (5), which are based on the quantity M of TRPs.

At block 1106, the process 1100 includes determining a data message based on the first transmission and the second transmission. For example, determining the data message can be based on canceling the first AN signal and the second AN signal. In some cases, canceling the first AN signal and the second AN signal is based on soft combining the first transmission and the second transmission, such that the AN contribution included in the transmission received by the UE is automatically canceled to yield the data message from the data signals that were previously combined with the AN signals in each transmission. In some examples, determining the data message based on the first transmission and the second transmission comprises soft combining the first transmission and the second transmission using the first filter coefficient and the second filter coefficient. The first AN signal and the second AN signal can be canceled based on the soft combining, and the resulting the data message includes one or more of the first data signal and the second data signal.

In some examples, the first data signal and the second data signal may be the same. In some cases, the first data signal can be different from the second data signal, and a first portion of the data message can be determined based on the first data signal and a second portion of the data message can be determined based on the second data signal.

Figure 12:
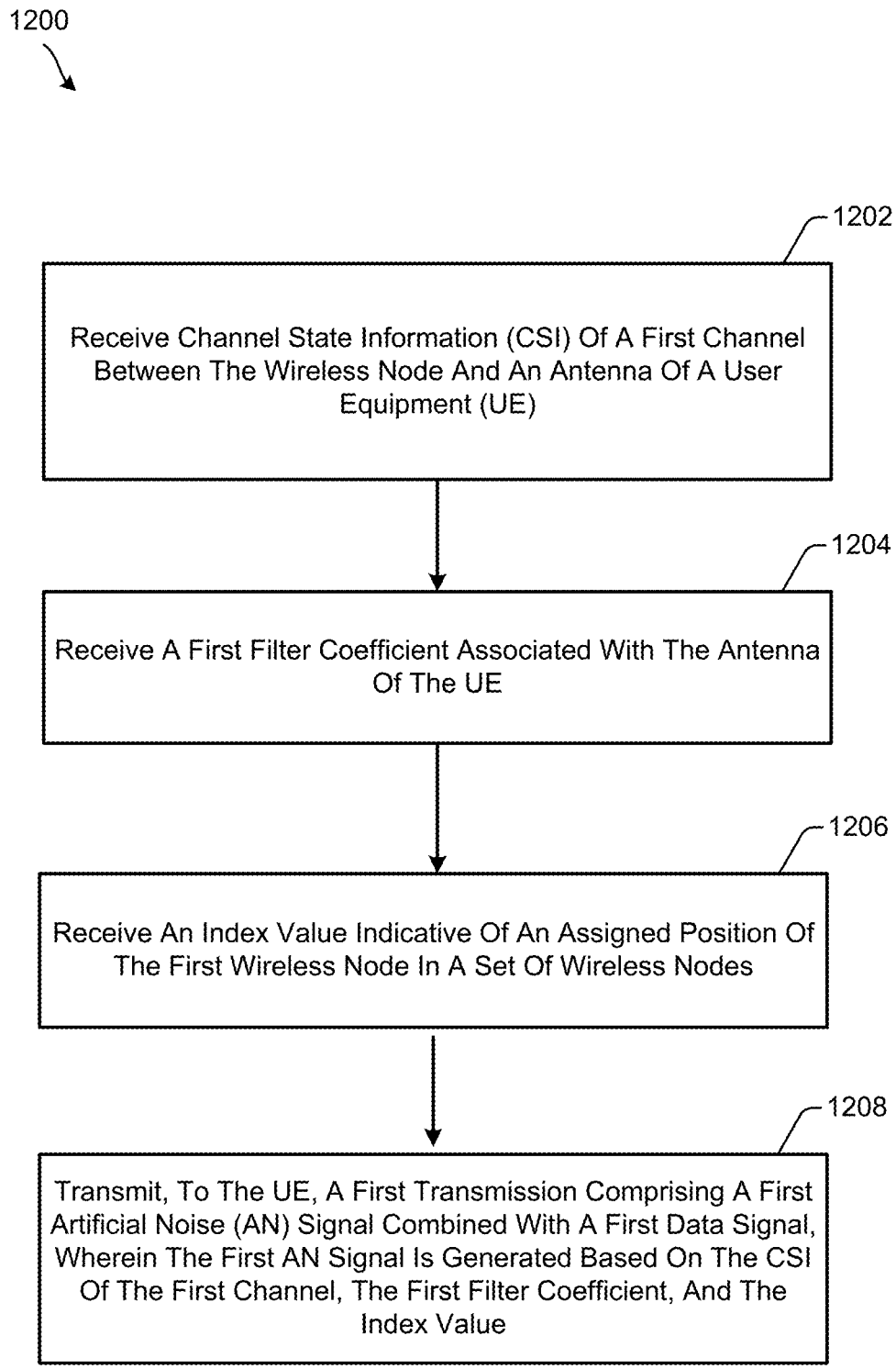
FIG. 12 is a flow diagram illustrating an example of a process for wireless communications at a first wireless node, in accordance with some examples.

FIG. 12 is a flowchart diagram illustrating an example of a process 1200 for wireless communications at a first wireless node. In some examples, the first wireless node can be the same as or similar to one or more of the base stations 102, 180 illustrated in FIG. 1, the base station 102 illustrated in FIG. 2, the O-RAN illustrated in FIG. 3, the base stations 102 illustrated in FIG. 7, etc.

In some examples, the first wireless node can be a first transmit-receive point (TRP) and may be the same as or similar to one or more of the TRPs 102-1, 102-n, 102-M illustrated in FIG. 8 and/or may the same as or similar to TRP 102-m illustrated in FIG. 10.

At block 1202, the process 1200 includes receiving channel state information (CSI) of a first channel between the first wireless node and an antenna of a user equipment (UE). For example, the UE can be the same as or similar to one or more of the UEs 104 illustrated in FIGS. 1 and 2, the UEs 320 illustrated in FIG. 3, the electronic device 607 illustrated in FIG. 6, the UEs 104 illustrated in FIG. 7, the UE 104 illustrated in FIG. 8, the UE 104 illustrated in FIG. 10, etc.

In some examples, CSI can be received for a first channel between a first wireless node or TRP (e.g., TRP #1, 102-1 illustrated in FIG. 8) and an antenna of a UE (e.g., UE 104 illustrated in FIG. 8). For example, the CSI can be the same as or similar to the CSI information/effective channel information $h_1$ illustrated in FIG. 8. In some cases, the CSI can be the same as or similar to the CSI information/effective channel information h illustrated in FIG. 8 and/or FIG. 10 (e.g., $h_1$, $h_n$, $h_M$ illustrated in FIG. 8 and/or $h_{m1}$, $h_{mN}$ illustrated in FIG. 10).

At block 1204, the process 1200 includes receiving a first filter coefficient associated with the antenna of the UE. For example, the first filter coefficient can be a complex coefficient α and/or can be a receive filter tap v. One or more (or both) of the complex coefficient α receive filter tap v can be associated with the first wireless node (e.g., the TRP), can be associated with the UE (e.g., UE 104), and/or can be associated with both the first wireless node and the UE (e.g., can be associated with the first channel between the TRP and the UE).

At block 1206, the process 1200 includes receiving an index value indicative of an assigned position of the first wireless node in a set of wireless nodes. For example, the index value can be the same as or similar to the index value n associated with the TRPs illustrated in FIG. 8 and/or FIG. 10.

At block 1208, the process 1200 includes transmitting, to the UE, a first transmission comprising a first artificial noise (AN) signal combined with a first data signal, wherein the first AN signal is generated based on the CSI of the first channel, the first filter coefficient, and the index value. For example, the first AN signal can be the same as or similar to the AN signals $\beta$ illustrated in FIG. 8 and/or FIG. 10 (e.g., $\beta_1$, $\beta_n$, $\beta_M$ illustrated in FIG. 8 and/or $\beta_m$ illustrated in FIG. 10). For example, the first AN signal $\beta$ can be combined with a first data signal x (e.g., $x_1$, $x_n$, $x_M$ illustrated in FIG. 8 and/or $x_m$ illustrated in FIG. 10) to generate or otherwise obtain the first transmission.

In some examples, the first AN signal can be generated based on CSI of the first channel between the UE and the first wireless node (e.g., first TRP). In some cases, the first AN signal can be generated based on the CSI $h_1$ of the first channel and a first filter coefficient associated with a receive antenna group of the UE. The first AN signal can be included AN-impaired transmission $\alpha_1 x_1 + \beta_1$, wherein $\alpha_1$ (e.g., as illustrated in FIG. 8) represents the first filter coefficient associated with the receive antenna group of the UE. In some cases, the first channel can be associated with a first receive antenna group of the UE and a second channel (e.g., described below) can be associated with a second receive antenna group of the UE.

In some examples, the first data signal can comprise at least a portion of a data message transmitted to the UE using the set of wireless nodes. For example, the first data signal can be the same as or similar to the data signal(s) x illustrated in FIG. 8 and/or FIG. 10 (e.g., $x_1$, $x_n$, $x_M$ illustrated in FIG. 8 and/or $x_m$ illustrated in FIG. 10). In some cases, the first AN signal can be further generated using a pseudo-random noise value associated with the set of wireless nodes. For example, the first AN signal and the second AN signal can be generated using a common random noise u, as described above with respect to FIG. 8 and/or FIG. 10. In some cases, the first AN signal can be generated using a common random noise u and a rotation angle $\varphi$, as described above with respect to FIG. 8 and/or FIG. 10. In some examples, the first AN signal can be further generated based on a quantity of wireless nodes (e.g., TRPs) used for transmission of at least a portion of the data message impaired by an AN signal. For example, the first AN signal can be generated based on the quantity M of TRPs, as described with respect to FIG. 8 above. In some examples, the first AN signal can be generated based on a phase value $\theta_n$ that is determined based on the index value n. For example, the first AN signal can be generated based on the phase value $\theta_n$ given by Eq. (5), above. In some cases, the first AN signal can be generated based on $\beta_n$ and $\theta_n$ of Eq. (5), which are based on the quantity M of TRPs. In some examples, the first AN signal can be generated to cancel with one or more additional AN signals generated by one or more respective additional wireless nodes included in the set of wireless nodes. In some cases, each additional AN signal of the one or more additional AN signals is generated using the pseudo-random noise value and a different index value.

In some examples, the processes described herein (e.g., process 1100, process 1200, and/or other process described herein) may be performed by a computing device or apparatus (e.g., a UE, a network entity, etc.). In one example, the process(es) 1100 and/or 1200 may be performed by a wireless communication device, such as a UE (e.g., UE 104). In one example, the process(es) 1100 and/or 1200 may be performed by a wireless node or base station (e.g., base station 102). In another example, the process(es) 1100 and/or 1200 may be performed by a computing device with the computing system architecture 1300 shown in FIG. 13. For instance, a wireless communication device with the computing architecture shown in FIG. 13 may include the components of the UE and/or wireless node and may implement the operations of process(es) 1100 and/or 1200.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes 1100 and 1200 are illustrated as logical flow diagrams, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1100, the process 1200, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
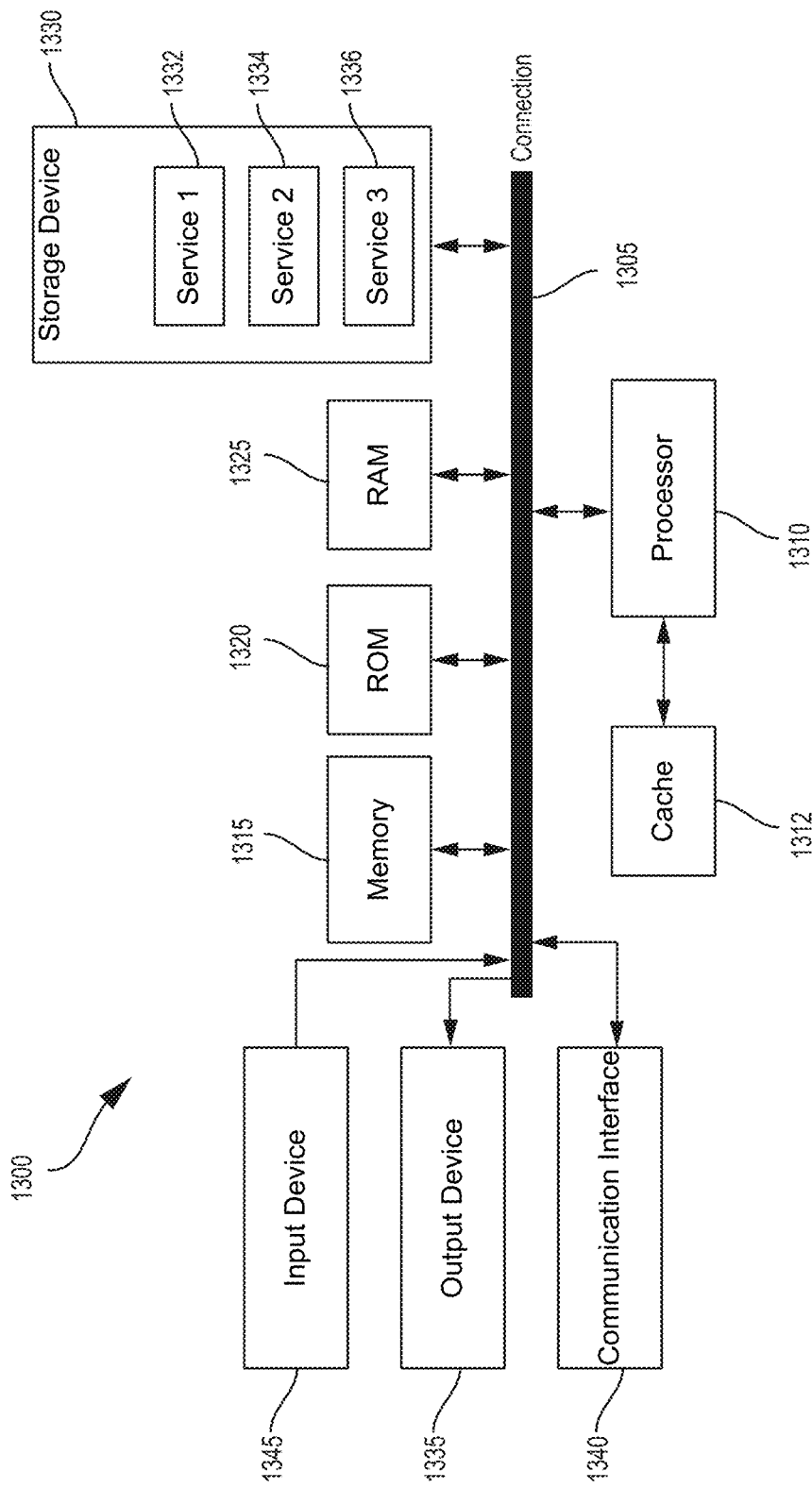
FIG. 13 is a block diagram illustrating an example of a computing system, in accordance with some examples.

FIG. 13 is a diagram illustrating an example of a system for implementing certain aspects of the present technology. In particular, FIG. 13 illustrates an example of computing system 1300, which may be for example any computing device making up internal computing system, a remote computing system, a camera, or any component thereof in which the components of the system are in communication with each other using connection 1305. Connection 1305 may be a physical connection using a bus, or a direct connection into processor 1310, such as in a chipset architecture. Connection 1305 may also be a virtual connection, networked connection, or logical connection.

In some aspects, computing system 1300 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1300 includes at least one processing unit (CPU or processor) 1310 and connection 1305 that communicatively couples various system components including system memory 1315, such as read-only memory (ROM) 1320 and random-access memory (RAM) 1325 to processor 1310. Computing system 1300 may include a cache 1314 of high-speed memory connected directly with, in close proximity to, or integrated as part of processor 1310.

Processor 1310 may include any general-purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which may represent any number of input mechanisms, such as a microphone for speech, a touch-sensitive screen for gesture or graphical input, keyboard, mouse, motion input, speech, etc. Computing system 1300 may also include output device 1335, which may be one or more of a number of output mechanisms. In some instances, multimodal systems may enable a user to provide multiple types of input/output to communicate with computing system 1300.

Computing system 1300 may include communications interface 1340, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 may include software services, servers, services, etc., that when the code that defines such software is executed by the processor 1310, it causes the system to perform a function. In some aspects, a hardware service that performs a particular function may include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general-purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1: A method for wireless communications at a user equipment (UE), comprising: receiving, from a first wireless node via a first channel, a first transmission comprising a first artificial noise (AN) signal combined with a first data signal, wherein the first AN signal is generated based on channel state information (CSI) of the first channel; receiving, from a second wireless node via a second channel, a second transmission comprising a second AN signal combined with a second data signal, wherein the second AN signal is generated based on CSI of the second channel and is different from the first AN signal; and determining a data message based on the first transmission and the second transmission.

Aspect 2: The method of Aspect 1, wherein determining the data message is based on canceling the first AN signal and the second AN signal.

Aspect 3: The method of Aspect 2, wherein canceling the first AN signal and the second AN signal is based on soft combining the first transmission and the second transmission.

Aspect 4: The method of any of Aspects 1 to 3, wherein: the first AN signal is generated based on the CSI of the first channel and a first filter coefficient associated with a receive antenna group of the UE; and the second AN signal is generated based on the CSI of the second channel and a second filter coefficient associated with the receive antenna group of the UE, wherein the second filter coefficient is different from the first filter coefficient.

Aspect 5: The method of Aspect 4, wherein: determining the data message based on the first transmission and the second transmission comprises soft combining the first transmission and the second transmission using the first filter coefficient and the second filter coefficient; the first AN signal and the second AN signal are canceled based on the soft combining; and the data message includes one or more of the first data signal and the second data signal.

Aspect 6: The method of Aspect 5 wherein the first data signal and the second data signal are the same.

Aspect 7: The method of any of Aspects 5 to 6, wherein: the first data signal is different from the second data signal; and a first portion of the data message is determined based on the first data signal and a second portion of the data message is determined based on the second data signal.

Aspect 8: The method of any of Aspects 1 to 7, wherein the first AN signal and the second AN signal are generated using a same pseudo-random noise and a same rotation angle.

Aspect 9: The method of Aspect 8, wherein the first AN signal and the second AN signal are further generated based on a quantity of wireless nodes used for transmission of at least a portion of the data message impaired by an AN signal.

Aspect 10: The method of any of Aspects 1 to 9, wherein: the first channel is associated with a first receive antenna group of the UE; the second channel is associated with a second receive antenna group of the UE, the second receive antenna group different from the first receive antenna group.

Aspect 11: The method of Aspect 10, wherein: the first AN signal is generated based on the CSI of the first channel and a first filter coefficient, wherein the first filter coefficient is associated with the first wireless node and the first receive antenna group of the UE; and the second AN signal is generated based on the CSI of the second channel and a second filter coefficient, wherein the second filter coefficient is associated with the second wireless node and the second receive antenna group of the UE.

Aspect 12: A method for wireless communications at a first wireless node, comprising: receiving channel state information (CSI) of a first channel between the first wireless node and an antenna of a user equipment (UE); receiving a first filter coefficient associated with the antenna of the UE; receiving an index value indicative of an assigned position of the first wireless node in a set of wireless nodes; and transmitting, to the UE, a first transmission comprising a first artificial noise (AN) signal combined with a first data signal, wherein the first AN signal is generated based on the CSI of the first channel, the first filter coefficient, and the index value.

Aspect 13: The method of Aspect 12, wherein the first data signal comprises at least a portion of a data message transmitted to the UE using the set of wireless nodes.

Aspect 14: The method of Aspect 13, wherein the first AN signal is further generated using a pseudo-random noise value associated with the set of wireless nodes.

Aspect 15: The method of any of Aspects 13 to 14, wherein the first AN signal is further generated based on a phase value, the phase value determined based on the index value.

Aspect 16: The method of any of Aspects 14 to 15, wherein: the first AN signal is generated to cancel with one or more additional AN signals generated by one or more respective additional wireless nodes included in the set of wireless nodes; and each additional AN signal of the one or more additional AN signals is generated using the pseudo-random noise value and a different index value.

Aspect 17: The method of any of Aspects 12 to 16, further comprising: receiving CSI of a second channel between the first wireless node and a second antenna of the UE; receiving a second filter coefficient associated with the second antenna of the UE; and generating the first AN signal based on the CSI of the first channel, the CSI of the second channel, the first filter coefficient, and the second filter coefficient.

Aspect 18: The method of Aspect 17, further comprising transmitting, to the UE, a second transmission comprising the first AN signal combined with the first data signal.

Aspect 19: An apparatus of a user equipment (UE) for wireless communications, comprising: at least one memory; and at least one processor coupled to the at least one memory and configured to: receive, from a first wireless node via a first channel, a first transmission comprising a first artificial noise (AN) signal combined with a first data signal, wherein the first AN signal is generated based on channel state information (CSI) of the first channel; receive, from a second wireless node via a second channel, a second transmission comprising a second AN signal combined with a second data signal, wherein the second AN signal is generated based on CSI of the second channel and is different from the first AN signal; and determine a data message based on the first transmission and the second transmission.

Aspect 20: The apparatus of Aspect 19, wherein determining the data message is based on canceling the first AN signal and the second AN signal by soft combining the first transmission and the second transmission.

Aspect 21: The apparatus of any of Aspects 19 to 20, wherein: the first AN signal is generated based on the CSI of the first channel and a first filter coefficient associated with a receive antenna group of the UE; and the second AN signal is generated based on the CSI of the second channel and a second filter coefficient associated with the receive antenna group of the UE, wherein the second filter coefficient is different from the first filter coefficient.

Aspect 22: The apparatus of Aspect 21, wherein: to determine the data message based on the first transmission and the second transmission, the at least one processor is configured to soft combine the first transmission and the second transmission using the first filter coefficient and the second filter coefficient; the first AN signal and the second AN signal are canceled based on the soft combining; and the data message includes one or more of the first data signal and the second data signal.

Aspect 23: The apparatus of Aspect 22, wherein the first data signal and the second data signal are the same.

Aspect 24: The apparatus of any of Aspects 22 to 23, wherein: the first data signal is different from the second data signal; and a first portion of the data message is determined based on the first data signal and a second portion of the data message is determined based on the second data signal.

Aspect 25: The apparatus of any of Aspects 19 to 24, wherein the first AN signal and the second AN signal are generated using a same pseudo-random noise and a same rotation angle.

Aspect 26: The apparatus of Aspect 25, wherein the first AN signal and the second AN signal are further generated based on a quantity of wireless nodes used for transmission of at least a portion of the data message impaired by an AN signal.

Aspect 27: The apparatus of any of Aspects 19 to 26, wherein: the first channel is associated with a first receive antenna group of the UE; and the second channel is associated with a second receive antenna group of the UE, the second receive antenna group different from the first receive antenna group.

Aspect 28: The apparatus of Aspect 27, wherein: the first AN signal is generated based on the CSI of the first channel and a first filter coefficient, wherein the first filter coefficient is associated with the first wireless node and the first receive antenna group of the UE; and the second AN signal is generated based on the CSI of the second channel and a second filter coefficient, wherein the second filter coefficient is associated with the second wireless node and the second receive antenna group of the UE.

Aspect 29: An apparatus of a wireless node for wireless communications, comprising: at least one memory; and at least one processor coupled to the at least one memory and configured to: receive channel state information (CSI) of a first channel between the wireless node and an antenna of a user equipment (UE); receive a first filter coefficient associated with the antenna of the UE; receive an index value indicative of an assigned position of the wireless node in a set of wireless nodes; and transmit, to the UE, a first transmission comprising a first artificial noise (AN) signal combined with a first data signal, wherein the first AN signal is generated based on the CSI of the first channel, the first filter coefficient, and the index value.

Aspect 30: The apparatus of Aspect 29, wherein the first AN signal is further generated based on one or more of a phase value associated with the index value and a pseudo-random noise value associated with the set of wireless nodes.

Aspect 31: An apparatus for wireless communications, at least one memory; and at least one processor coupled to the at least one memory, wherein the at least one processor is configured to perform operations in accordance with any one of Aspects 1 to 11.

Aspect 32: An apparatus for wireless communications, comprising means for performing operations in accordance with any one of Aspects 1 to 11.

Aspect 33: A non-transitory computer-readable medium having stored thereon instructions that, when executed by one or more processors, cause the one or more processors to perform operations according to any one of Aspects 1 to 11.

Aspect 34: An apparatus for wireless communications, at least one memory; and at least one processor coupled to the at least one memory, wherein the at least one processor is configured to perform operations in accordance with any one of Aspects 12 to 18.

Aspect 35: An apparatus for wireless communications, comprising means for performing operations in accordance with any one of Aspects 12 to 18.

Aspect 36: A non-transitory computer-readable medium having stored thereon instructions that, when executed by one or more processors, cause the one or more processors to perform operations according to any one of Aspects 12 to 18.

Aspect 37: A non-transitory computer-readable medium having stored thereon instructions that, when executed by one or more processors, cause the one or more processors to perform operations according to any one of Aspects 19 to 30.

What is claimed is:

1. A method for wireless communications at a user equipment (UE), comprising:
   receiving, from a first wireless node via a first channel, a first transmission comprising a first artificial noise (AN) signal combined with a first data signal, wherein the first AN signal is generated based on channel state information (CSI) of the first channel;
   receiving, from a second wireless node via a second channel, a second transmission comprising a second AN signal combined with a second data signal, wherein the second AN signal is generated based on CSI of the second channel and is different from the first AN signal, and wherein the first AN signal and the second AN signal are generated using a same pseudo-random noise and a same rotation angle; and
   determining a data message based on the first transmission and the second transmission.

2. The method of claim 1, wherein determining the data message is based on canceling the first AN signal and the second AN signal.

3. The method of claim 2, wherein canceling the first AN signal and the second AN signal is based on soft combining the first transmission and the second transmission.

4. The method of claim 1, wherein:
   the first AN signal is generated based on the CSI of the first channel and a first filter coefficient associated with a receive antenna group of the UE; and
   the second AN signal is generated based on the CSI of the second channel and a second filter coefficient associated with the receive antenna group of the UE, wherein the second filter coefficient is different from the first filter coefficient.

5. The method of claim 4, wherein:
   determining the data message based on the first transmission and the second transmission comprises soft combining the first transmission and the second transmission using the first filter coefficient and the second filter coefficient;
   the first AN signal and the second AN signal are canceled based on the soft combining; and
   the data message includes one or more of the first data signal or the second data signal.

6. The method of claim 5 wherein the first data signal and the second data signal are the same.

7. The method of claim 5, wherein:
   the first data signal is different from the second data signal; and
   a first portion of the data message is determined based on the first data signal and a second portion of the data message is determined based on the second data signal.

8. The method of claim 1, wherein the first AN signal and the second AN signal are further generated based on a quantity of wireless nodes used for transmission of at least a portion of the data message impaired by an AN signal.

9. The method of claim 1, wherein:
   the first channel is associated with a first receive antenna group of the UE; and
   the second channel is associated with a second receive antenna group of the UE, the second receive antenna group different from the first receive antenna group.

10. The method of claim 9, wherein:
    the first AN signal is generated based on the CSI of the first channel and a first filter coefficient, wherein the first filter coefficient is associated with the first wireless node and the first receive antenna group of the UE; and the second AN signal is generated based on the CSI of the second channel and a second filter coefficient, wherein the second filter coefficient is associated with the second wireless node and the second receive antenna group of the UE.

11. A method for wireless communications at a first wireless node, comprising:

receiving channel state information (CSI) of a first channel between the first wireless node and an antenna of a user equipment (UE);

receiving a first filter coefficient associated with the antenna of the UE;

receiving an index value indicative of an assigned position of the first wireless node in a set of wireless nodes; and transmitting, to the UE, a first transmission comprising a first artificial noise (AN) signal combined with a first data signal, wherein the first AN signal is generated based on the CSI of the first channel, the first filter coefficient, and the index value.

12. The method of claim 11, wherein the first data signal comprises at least a portion of a data message transmitted to the UE using the set of wireless nodes.

13. The method of claim 12, wherein the first AN signal is further generated using a pseudo-random noise value associated with the set of wireless nodes.

14. The method of claim 13, wherein:

the first AN signal is generated to cancel with one or more additional AN signals generated by one or more respective additional wireless nodes included in the set of wireless nodes; and each additional AN signal of the one or more additional AN signals is generated using the pseudo-random noise value and a different index value.

15. The method of claim 12, wherein the first AN signal is further generated based on a phase value, the phase value determined based on the index value.

16. The method of claim 11, further comprising:

receiving CSI of a second channel between the first wireless node and a second antenna of the UE;

receiving a second filter coefficient associated with the second antenna of the UE; and generating the first AN signal based on the CSI of the first channel, the CSI of the second channel, the first filter coefficient, and the second filter coefficient.

17. The method of claim 16, further comprising transmitting, to the UE, a second transmission comprising the first AN signal combined with the first data signal.

18. An apparatus of a user equipment (UE) for wireless communications, comprising:

at least one memory; and at least one processor coupled to the at least one memory and configured to:

receive, from a first wireless node via a first channel, a first transmission comprising a first artificial noise (AN) signal combined with a first data signal, wherein the first AN signal is generated based on channel state information (CSI) of the first channel;

receive, from a second wireless node via a second channel, a second transmission comprising a second AN signal combined with a second data signal, wherein the second AN signal is generated based on CSI of the second channel and is different from the first AN signal, and wherein the first AN signal and the second AN signal are generated using a same pseudo-random noise and a same rotation angle; and determine a data message based on the first transmission and the second transmission.

19. The apparatus of claim 18, wherein determining the data message is based on canceling the first AN signal and the second AN signal by soft combining the first transmission and the second transmission.

20. The apparatus of claim 18, wherein:

the first AN signal is generated based on the CSI of the first channel and a first filter coefficient associated with a receive antenna group of the UE; and the second AN signal is generated based on the CSI of the second channel and a second filter coefficient associated with the receive antenna group of the UE, wherein the second filter coefficient is different from the first filter coefficient.

21. The apparatus of claim 20, wherein:

to determine the data message based on the first transmission and the second transmission, the at least one processor is configured to soft combine the first transmission and the second transmission using the first filter coefficient and the second filter coefficient;

the first AN signal and the second AN signal are canceled based on the soft combining; and the data message includes one or more of the first data signal or the second data signal.

22. The apparatus of claim 21, wherein the first data signal and the second data signal are the same.

23. The apparatus of claim 21, wherein:

the first data signal is different from the second data signal; and a first portion of the data message is determined based on the first data signal and a second portion of the data message is determined based on the second data signal.

24. The apparatus of claim 18, wherein the first AN signal and the second AN signal are further generated based on a quantity of wireless nodes used for transmission of at least a portion of the data message impaired by an AN signal.

25. The apparatus of claim 18, wherein:

the first channel is associated with a first receive antenna group of the UE; and the second channel is associated with a second receive antenna group of the UE, the second receive antenna group different from the first receive antenna group.

26. The apparatus of claim 25, wherein:

the first AN signal is generated based on the CSI of the first channel and a first filter coefficient, wherein the first filter coefficient is associated with the first wireless node and the first receive antenna group of the UE; and the second AN signal is generated based on the CSI of the second channel and a second filter coefficient, wherein the second filter coefficient is associated with the second wireless node and the second receive antenna group of the UE.

27. An apparatus of a wireless node for wireless communications, comprising:

at least one memory; and at least one processor coupled to the at least one memory and configured to:

receive channel state information (CSI) of a first channel between the wireless node and an antenna of a user equipment (UE);

receive a first filter coefficient associated with the antenna of the UE;

receive an index value indicative of an assigned position of the wireless node in a set of wireless nodes; and transmit, to the UE, a first transmission comprising a first artificial noise (AN) signal combined with a first data signal, wherein the first AN signal is generated based on the CSI of the first channel, the first filter coefficient, and the index value.

28. The apparatus of claim 27, wherein the first AN signal is further generated based on one or more of a phase value associated with the index value or a pseudo-random noise value associated with the set of wireless nodes.

29. The apparatus of claim 28, wherein:

the first AN signal is generated to cancel with one or more additional AN signals generated by one or more respective additional wireless nodes included in the set of wireless nodes; and each additional AN signal of the one or more additional AN signals is generated using the pseudo-random noise value and a different index value.

30. The apparatus of claim 27, wherein the at least one processor is configured to:

receive CSI of a second channel between the wireless node and a second antenna of the UE;

receive a second filter coefficient associated with the second antenna of the UE;

generate the first AN signal based on the CSI of the first channel, the CSI of the second channel, the first filter coefficient, and the second filter coefficient; and transmit, to the UE, a second transmission comprising the first AN signal combined with the first data signal.

* * * * *